(12) United States Patent
Iwata et al.

(10) Patent No.: US 9,043,057 B2
(45) Date of Patent: May 26, 2015

(54) CONTROL DEVICE FOR PROPULSION MACHINE

(75) Inventors: Kenichi Iwata, Chiyoda-ku (JP); Makoto Itoi, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 91 days.

(21) Appl. No.: 13/204,303

(22) Filed: Aug. 5, 2011

(65) Prior Publication Data
US 2012/0232727 A1      Sep. 13, 2012

(30) Foreign Application Priority Data
Mar. 10, 2011  (JP) .................................. 2011-052756

(51) Int. Cl.
| | | |
|---|---|---|
| *B63H 21/21* | (2006.01) | |
| *B60W 10/06* | (2006.01) | |
| *B63H 20/00* | (2006.01) | |

(52) U.S. Cl.
CPC ................ *B63H 21/21* (2013.01); *B60W 10/06* (2013.01); *B63H 21/213* (2013.01); *B63H 2020/003* (2013.01); *B63H 2021/216* (2013.01)

(58) Field of Classification Search
CPC ...... B63H 21/21; B63H 21/213; B60W 10/06
USPC ........................................ 701/21, 102; 440/1
See application file for complete search history.

(56) References Cited

U.S. PATENT DOCUMENTS

| | | | | |
|---|---|---|---|---|
| 8,050,795 | B2* | 11/2011 | Dollens ......................... | 700/230 |
| 2008/0160845 | A1* | 7/2008 | Kado et al. ......................... | 440/1 |
| 2009/0209144 | A1* | 8/2009 | Suzuki et al. ...................... | 440/1 |
| 2010/0049386 | A1* | 2/2010 | Bamba ............................ | 701/21 |

FOREIGN PATENT DOCUMENTS

JP          2008-163863 A      7/2008

* cited by examiner

*Primary Examiner* — Fadey Jabr
*Assistant Examiner* — Yazan A Soofi
(74) *Attorney, Agent, or Firm* — Sughrue Mion, PLLC; Richard C. Turner

(57) ABSTRACT

A control device controls the operating state of each of a plurality of propulsion machines arranged in parallel in a marine vessel. Control devices are connected to each other by a communication line through which operating information of the propulsion machine is mutually transmitted and received. The control device includes a unit which determines the installation position of a corresponding propulsion machine, a unit which determines the connection state of another propulsion machine connected to the communication line, and a unit which determines a propulsion machine as a control reference from among a plurality of control devices. The propulsion machine as a control reference is switched to a propulsion machine which is arbitrarily designated by an operator or a propulsion machine which has the highest priority as a control reference.

9 Claims, 22 Drawing Sheets

CONFIGURATION OF ENGINE CONTROL SECTION

CONFIGURATION OF OPERATOR SEAT CONTROL
SECTION AND ENGINE CONTROL SECTION

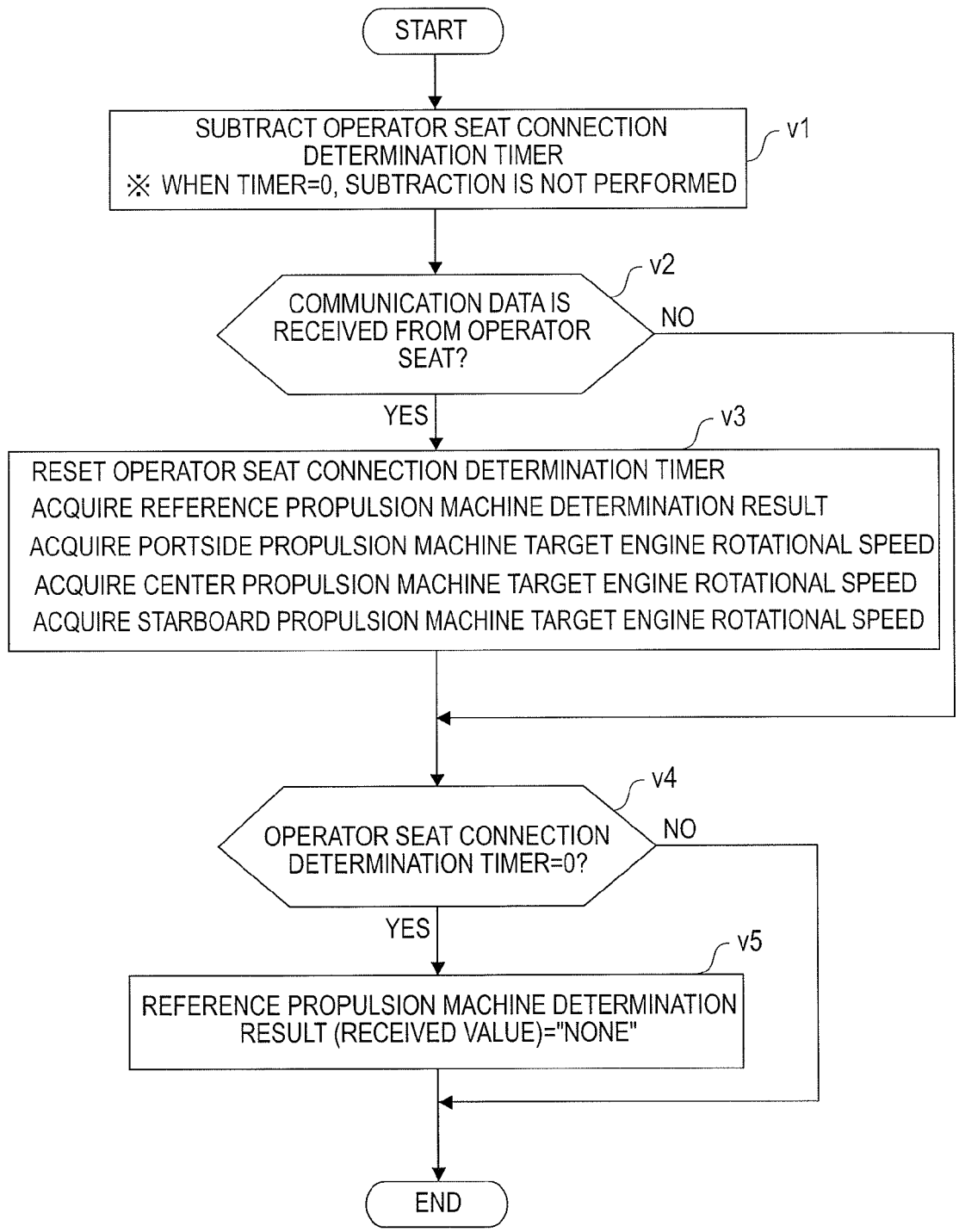

CONTROL DEVICE FOR PROPULSION MACHINE

BACKGROUND OF THE INVENTION

1. Field of the Invention

The present invention relates to a control device for a propulsion machine which controls the operating state of each of a plurality of propulsion machines arranged in parallel in a marine vessel in a state where the control devices of the propulsion machines are connected to each other by a communication line through which operating information of the propulsion machines is mutually transmitted and received, determines the priority of a propulsion machine as a control reference from the mutual operating states of the propulsion machines detected through the communication line, and switches the control reference to a propulsion machine having the highest priority.

2. Background Art

A plurality of propulsion machines, such as outboard motors, stern drives, or inboard/outboard motors, are arranged in a marine vessel, and control is performed in a state where control devices which control the operating states of the propulsion machines are connected to each other by a communication line through which operating information of the propulsion machines is mutually transmitted and received. In this control device, one of the propulsion machines becomes a propulsion machine as a control reference, the averaged engine rotational speed as a synchronization target is transmitted, and in a propulsion machine other than the synchronization target, the throttle opening degree is corrected for synchronization with the target engine rotational speed. Thus, synchronization is made with the engine rotational speed of the propulsion machine as a control reference (for example, see Patent Document 1).

[Patent Document 1] JP-A-2008-163863

However, in the device of the related art described in Patent Document 1, when the state as a control reference cannot be maintained, for example, when a fault occurs in the propulsion machine as a control reference, or the like, there is no description on specific means for switching the control reference to another propulsion machine. If the propulsion machine as a control reference cannot maintain the state as a control reference, synchronization control cannot be performed in another propulsion machine as a synchronization target.

SUMMARY OF THE INVENTION

The invention has been finalized in order to solve the problems inherent in the device of the related art, and an object of the invention is to provide a control device for a propulsion machine which, even when a propulsion machine as a control reference cannot maintain the state as a control reference, switches the control reference to another propulsion machine, thereby enabling synchronization control described in, for example, Patent Document 1.

According to an embodiment of the invention, there is provided a control device for a propulsion machine which controls the operating state of each of a plurality of propulsion machines arranged in parallel in a marine vessel. The control devices of the propulsion machines are connected to each other by a communication line through which operating information of the propulsion machines is mutually transmitted and received. The control device includes an installation position determination unit which determines the installation position of a corresponding propulsion machine, a connection state determination unit which determines the connection state of another propulsion machine connected to the communication line, and a propulsion machine determination unit which determines a propulsion machine as a control reference from among the plurality of control devices. The propulsion machine as a control reference is switched in accordance with the mutual operating states of the propulsion machines detected through the communication line.

With the control device for a propulsion machine according to the embodiment of the invention, a propulsion machine as a control reference can be switched such that the corresponding or another propulsion machine becomes the control reference in accordance with the operating states of the propulsion machines. Therefore, a propulsion machine as a synchronization target can be continuously controlled in accordance with a propulsion machine as a new control reference.

Accordingly, even when a propulsion machine cannot maintain the state as a control reference, for example, even when a fault occurs in a propulsion machine as a control reference, a propulsion machine as a synchronization target can be continuously controlled in accordance with a propulsion machine as a new control reference.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 28 is a flowchart of a communication line receiving section in an engine control section according to Embodiment 3 of the invention.

DETAILED DESCRIPTION OF THE INVENTION

Figure 1:
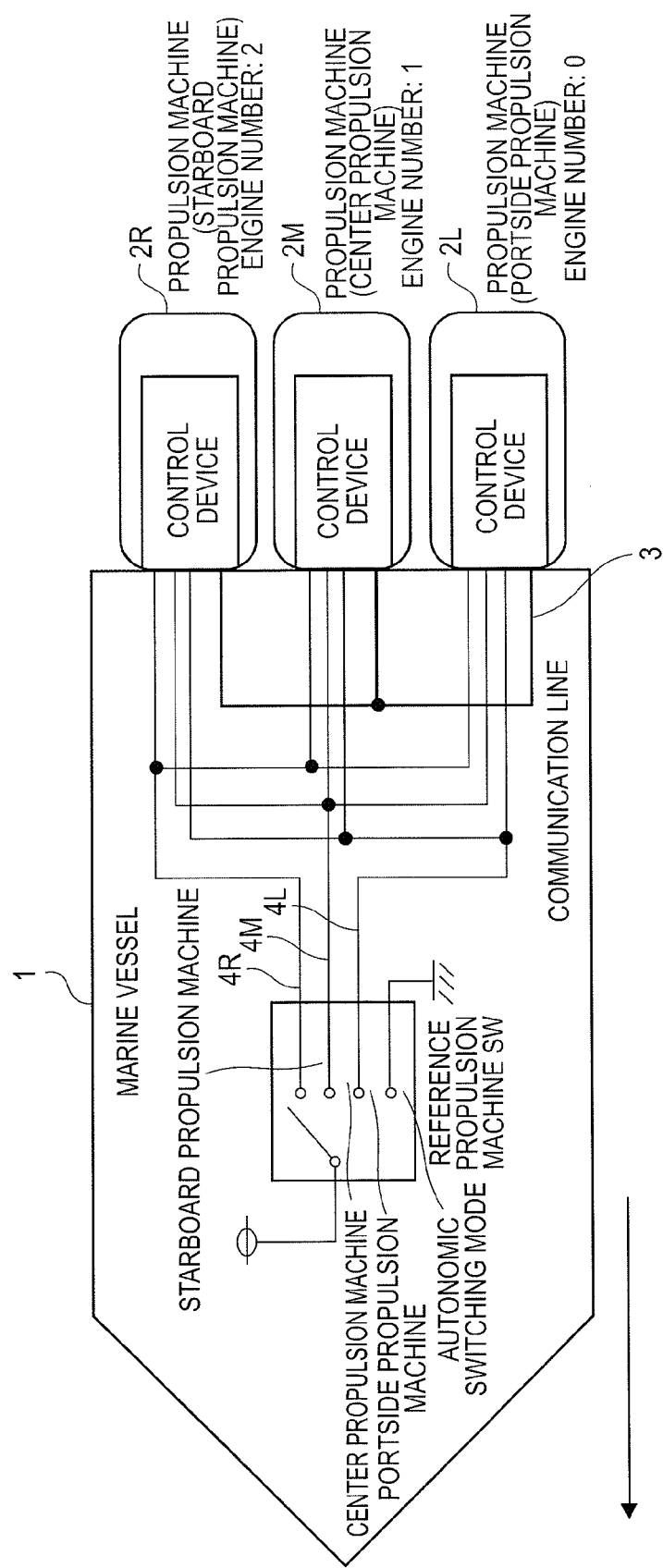
FIG. 1 is a schematic top view of a marine vessel which includes a control device for a propulsion machine according to Embodiment 1 of the invention.

Hereinafter, embodiments of the invention will be described in detail with reference to the drawings. In the drawings, the same reference numerals represent the same or corresponding portions.

Embodiment 1

FIG. 1 is a schematic top view of a marine vessel which includes a control device for a propulsion machine according to Embodiment 1 of the invention. Although in Embodiment 1, the marine vessel has three propulsion machines mounted in a hull thereof, a plurality (for example, two or more) of propulsion machines may be mounted. Although in Embodiment 1, an outboard motor is used as a propulsion machine, a stern drive or an inboard/outboard motor may be used.

For description, a propulsion machine which is disposed on the left side with respect to a forward drive direction of a marine vessel 1 indicated by an arrow of FIG. 1 is called as a portside propulsion machine 2L, a propulsion machine which is disposed on the right side is called a starboard propulsion machine 2R, and a propulsion machine which is disposed at the center is called a center propulsion machine 2M.

In FIG. 1, a control device is provided in each of the propulsion machines 2L, 2M, and 2R, and the control devices are connected to each other by a communication line 3.

Reference propulsion machine SWs (switches) 4L, 4M, and 4R which are used to detect a propulsion machine selected as a control reference by an operator are respectively connected to the control devices.

The reference propulsion machine SW 4L is an SW which is used to detect that the propulsion machine 2L is selected as a reference propulsion machine. The reference propulsion machine SW 4M is an SW (switch) which is used to detect that the propulsion machine 2M is selected as a reference propulsion machine. The reference propulsion machine SW 4R is an SW which is used to detect that the propulsion machine 2R is selected as a reference propulsion machine.

Although in Embodiment 1, the reference propulsion machine SWs 4L, 4M, and 4R in which a pull-up state is ON, SWs may be used in which a state other than the above-described state is ON. As described above, although in Embodiment 1, an example will be described where the SWs can select all the three propulsion machines provided in the marine vessel 1 as a reference propulsion machine, for example, one or two of the reference propulsion machine SWs 4L, 4M, and 4R may be connected to corresponding propulsion machines. Although in Embodiment 1, as described above, a reference propulsion machine switching instruction from an operator is detected by a switch input, a reference propulsion machine switching instruction from an operator may be detected by, for example, a reference propulsion machine switching instruction value received from a communication device 8 (see FIG. 2).

Figure 2:
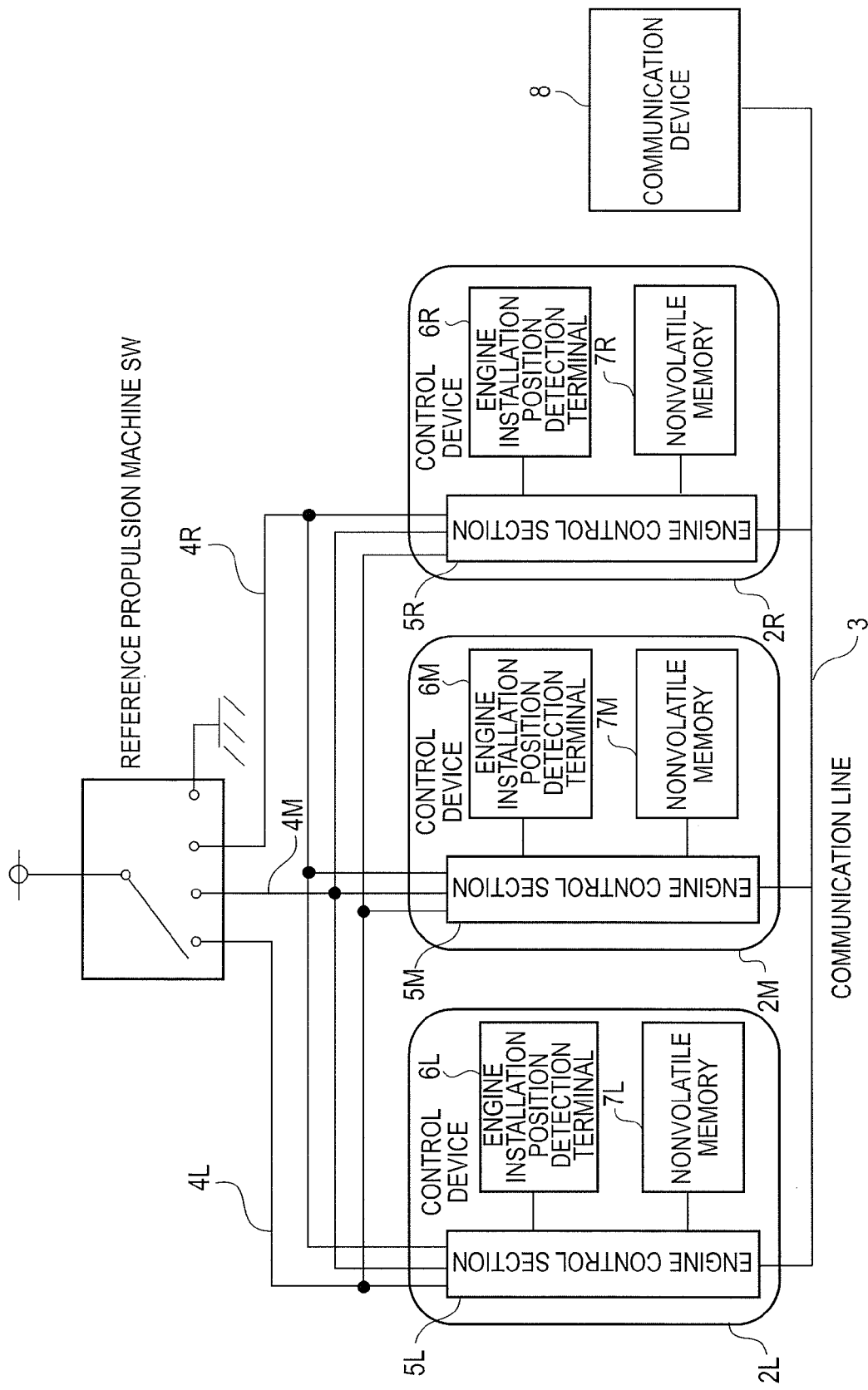
FIG. 2 is a system diagram of a control device for a propulsion machine according to Embodiment 1 of the invention.

FIG. 2 is a system diagram of a control device for a propulsion machine according to Embodiment 1. An engine control section 5L provided in the propulsion machine 2L on the left side reads an engine number from a nonvolatile memory 7L, and when the engine number read value is a value at the time of shipment of the control device, determines that the engine number is not learned. When the engine number is not learned, if a voltage value (A/D) input from an engine installation position detection terminal 6L is in a range of a portside propulsion machine determination voltage (equal to or greater than a portside propulsion machine determination lower limit value and smaller than a portside propulsion machine determination upper limit value), it is determined that the installation position of the corresponding propulsion machine is left, and an engine number corresponding to the installation position on the left side is obtained. The engine number determined by the engine installation position detection terminal 6L is stored in the nonvolatile memory 7L.

An engine control section 5R provided in the propulsion machine 2R on the right side reads an engine number from a nonvolatile memory 7R, and when the engine number read value is a value at the time of shipment of the control device, determines that the engine number is not learned. When the engine number is not learned, if a voltage value (A/D) input from an engine installation position detection terminal 6R is in a range of a starboard propulsion machine determination voltage (equal to or greater than a starboard propulsion machine determination lower limit value and smaller than a starboard propulsion machine determination upper limit value), it is determined that the installation position of the corresponding propulsion machine is right, and an engine number corresponding to the installation position on the right side is obtained. The engine number determined by the engine installation position detection terminal 6R is stored in the nonvolatile memory 7R.

An engine control section 5M provided in the propulsion machine 2M at the center reads an engine number from a nonvolatile memory 7M, and when the engine number read value is a value at the time of shipment of the control device, determines that the engine number is not learned. When the engine number is not learned, if a voltage value (A/D) input from an engine installation position detection terminal 6M is in a range of a center propulsion machine determination voltage (equal to or greater than a center propulsion machine determination lower limit value and smaller than a center propulsion machine determination upper limit value), it is determined that the installation position of the corresponding propulsion machine is center, and the engine number corresponding to the installation position at the center is obtained. The engine number determined by the engine installation position detection terminal 6M is stored in the nonvolatile memory 7M.

In Embodiment 1, it is determined that a propulsion machine having a minimum engine number from the propulsion machines 2L, 2M, and 2R is a propulsion machine as a control reference. For this reason, the engine number of the portside propulsion machine is set to "0", the engine number of the center propulsion machine is set to "1", and the engine number of the starboard propulsion machine is set to "2", such that a portside propulsion machine has higher priority as a control reference. Meanwhile, the engine number of the portside propulsion machine may be set to "2", the engine number of the center propulsion machine may be set to "1", and the engine number of the starboard propulsion machine may be set to "0", such that a propulsion machine on the starboard-most side becomes a propulsion machine as a control reference. Alternatively, the engine number of the portside propulsion machine may be set to "1", the engine number of the center propulsion machine may be set to "0", and the engine number of the starboard propulsion machine may be set to "2", such that a propulsion machine on the centermost side becomes a propulsion machine as a control reference. With regard to the priority as a control reference, it may be determined that a propulsion machine having a maximum engine number or a centermost value has highest priority.

In Embodiment 1, the engine installation position detection terminals 6L, 6M, and 6R are respectively provided in the engine control sections 5L, 5M, and 5R of the propulsion machines 2L, 2M, and 2R, and the communication device 8 is provided in the communication line 3. Thus, the engine position can be acquired by both the engine installation position detection terminals 6L, 6M, and 6R and the communication device 8. Meanwhile, either the engine installation position detection terminals 6L, 6M, and 6R or the communication device 8 may be provided.

When an engine number is received from the communication device 8, each of the engine control sections 5L, 5M, and 5R of the propulsion machines 2L, 2M, and 2R determines that the engine number is the engine number of the corresponding propulsion machine, and stores the engine number in each of the nonvolatile memories 7L, 7M, and 7R. When the engine number is not received from the communication device 8, the engine number read from each of the nonvolatile memories 7L, 7M, and 7R or the engine number determined by each of the engine installation position detection terminals 6L, 6M, and 6R is set as the engine number of the corresponding propulsion machine.

When the communication device 8 is not provided, and only each of the engine installation position detection terminals 6L, 6M, and 6R are provided to constitute a control device, the engine number can be obtained by each of the engine installation position detection terminals 6L, 6M, and 6R. Meanwhile, when the engine installation position detection terminals 6L, 6M, and 6R are not provided, and only the communication device 8 is provided to constitute a control device, the engine number can be obtained from the communication device 8. The communication device 8 may also be used for initially setting the engine number and for relearning an arbitrary value separately customized by a user.

Figure 3:
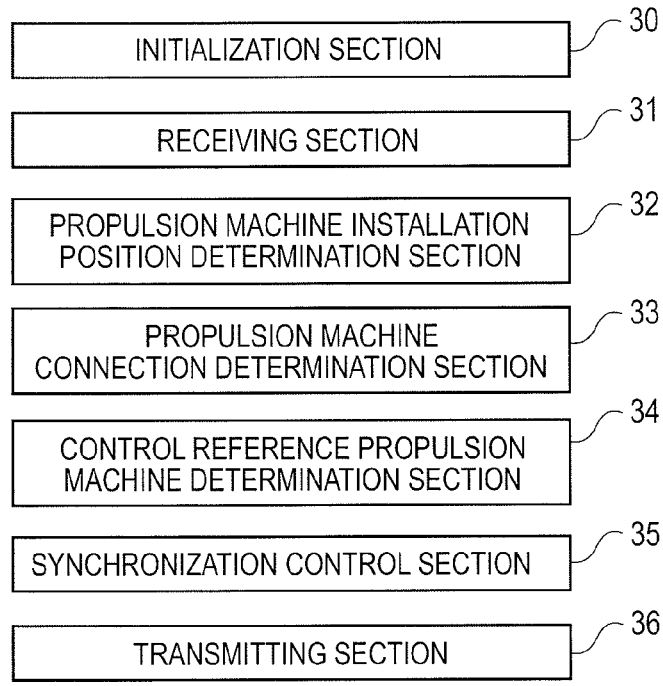
FIG. 3 is a diagram showing the configuration of an engine control section according to Embodiment 1 of the invention.
Figure 4:
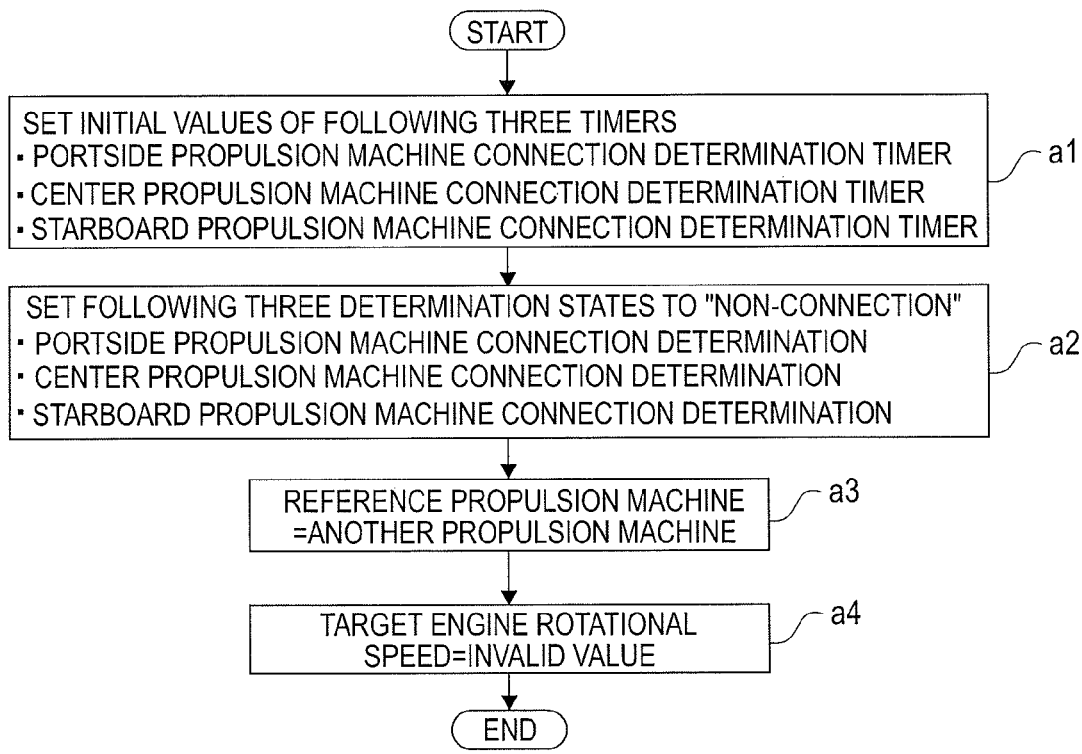
FIG. 4 is a flowchart of an initialization section according to Embodiment 1 of the invention.
Figure 5:
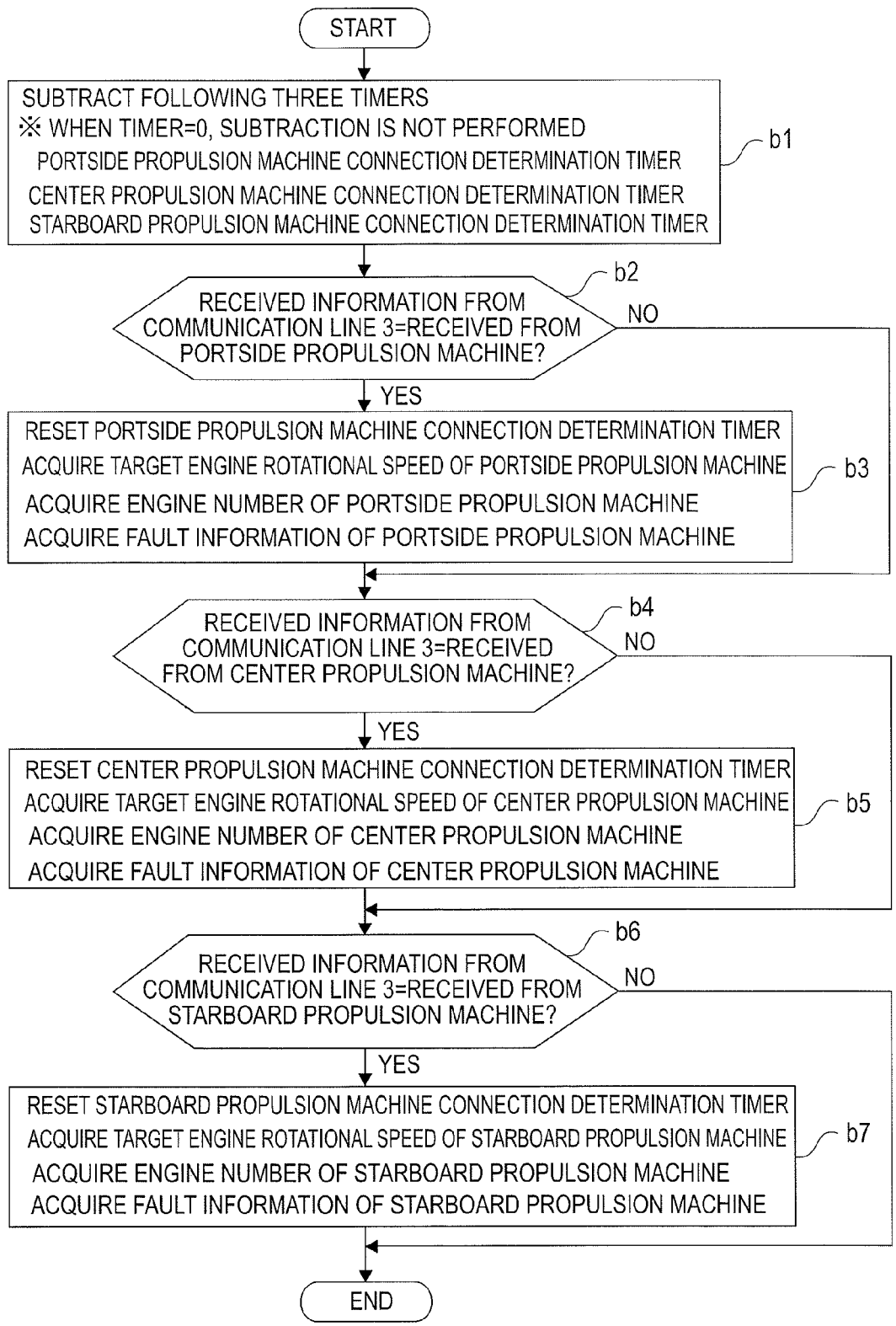
FIG. 5 is a flowchart of a receiving section according to Embodiment 1 of the invention.
Figure 6:
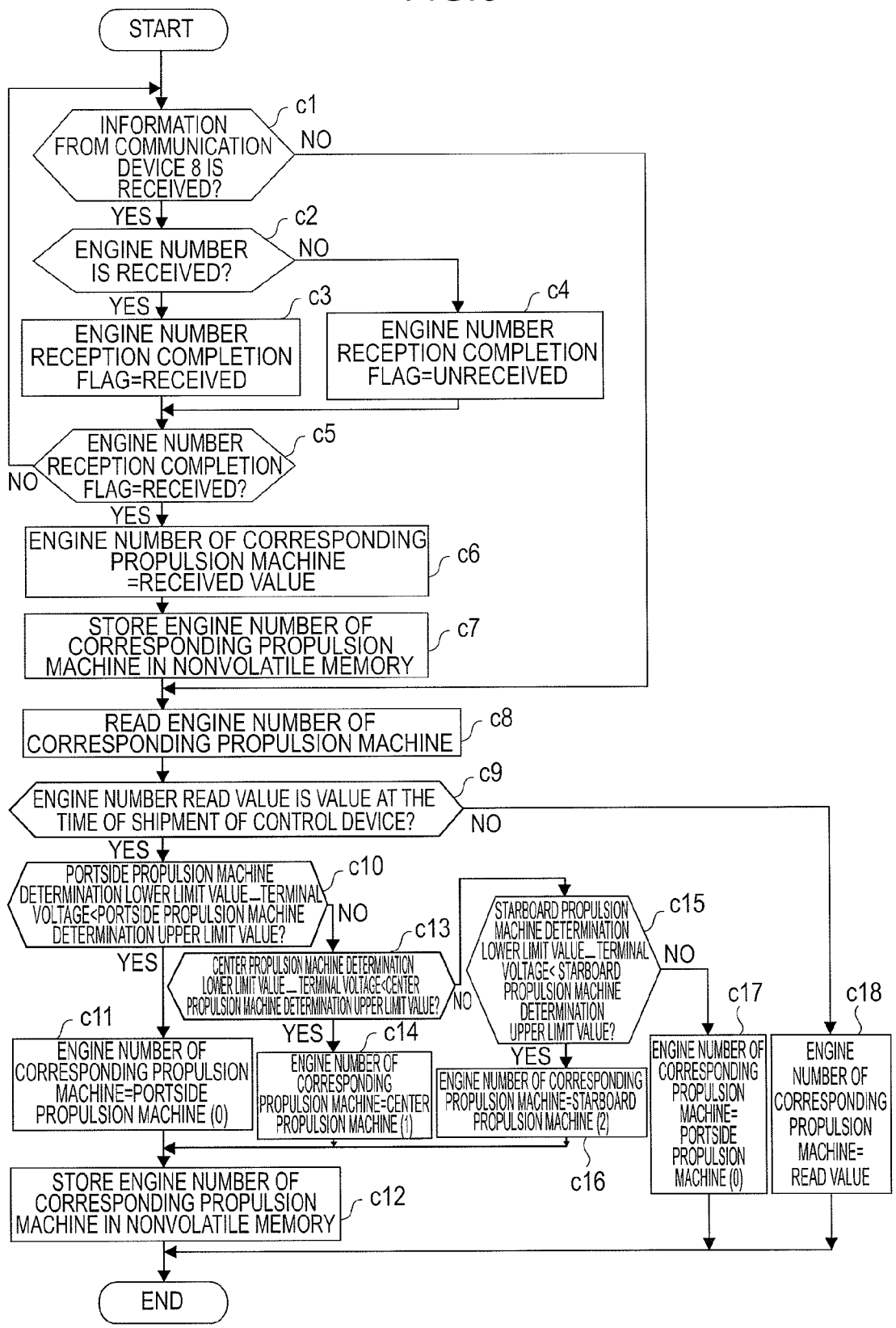
FIG. 6 is a flowchart of a propulsion machine installation position determination section according to Embodiment 1 of the invention.
Figure 7:
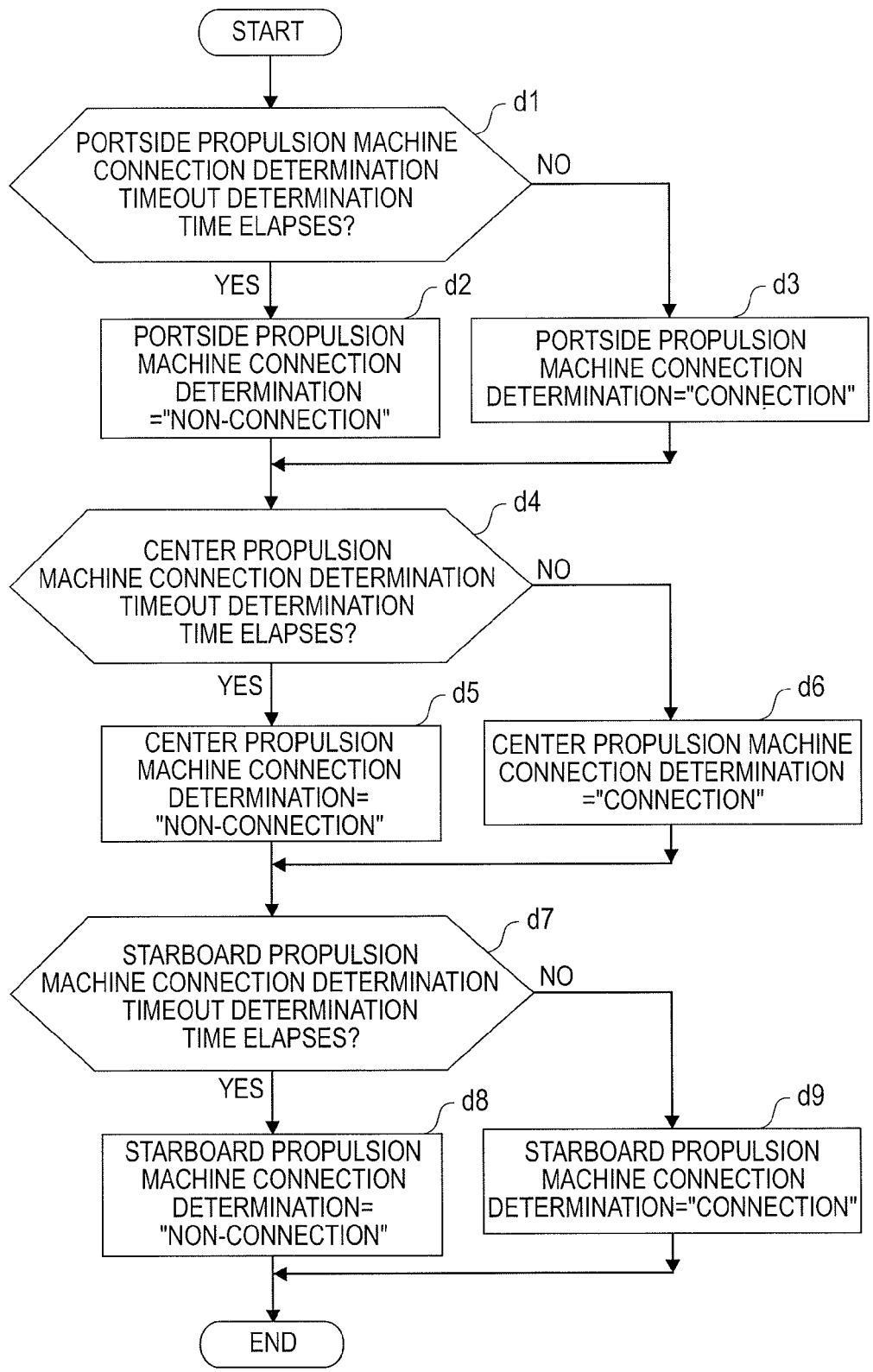
FIG. 7 is a flowchart of a propulsion machine connection determination section according to Embodiment 1 of the invention.
Figure 8:
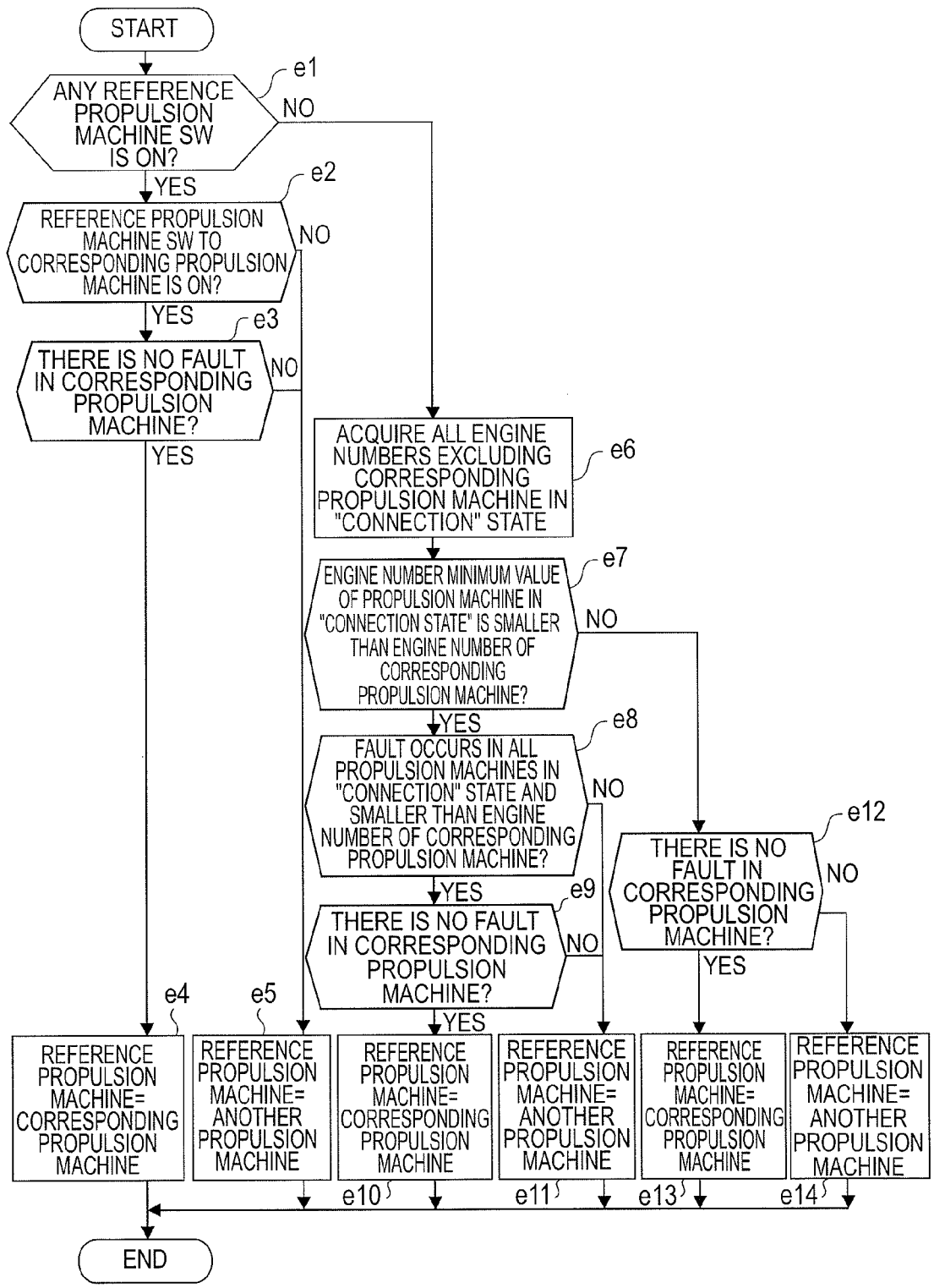
FIG. 8 is a flowchart of a control reference propulsion machine determination section according to Embodiment 1 of the invention.
Figure 9:
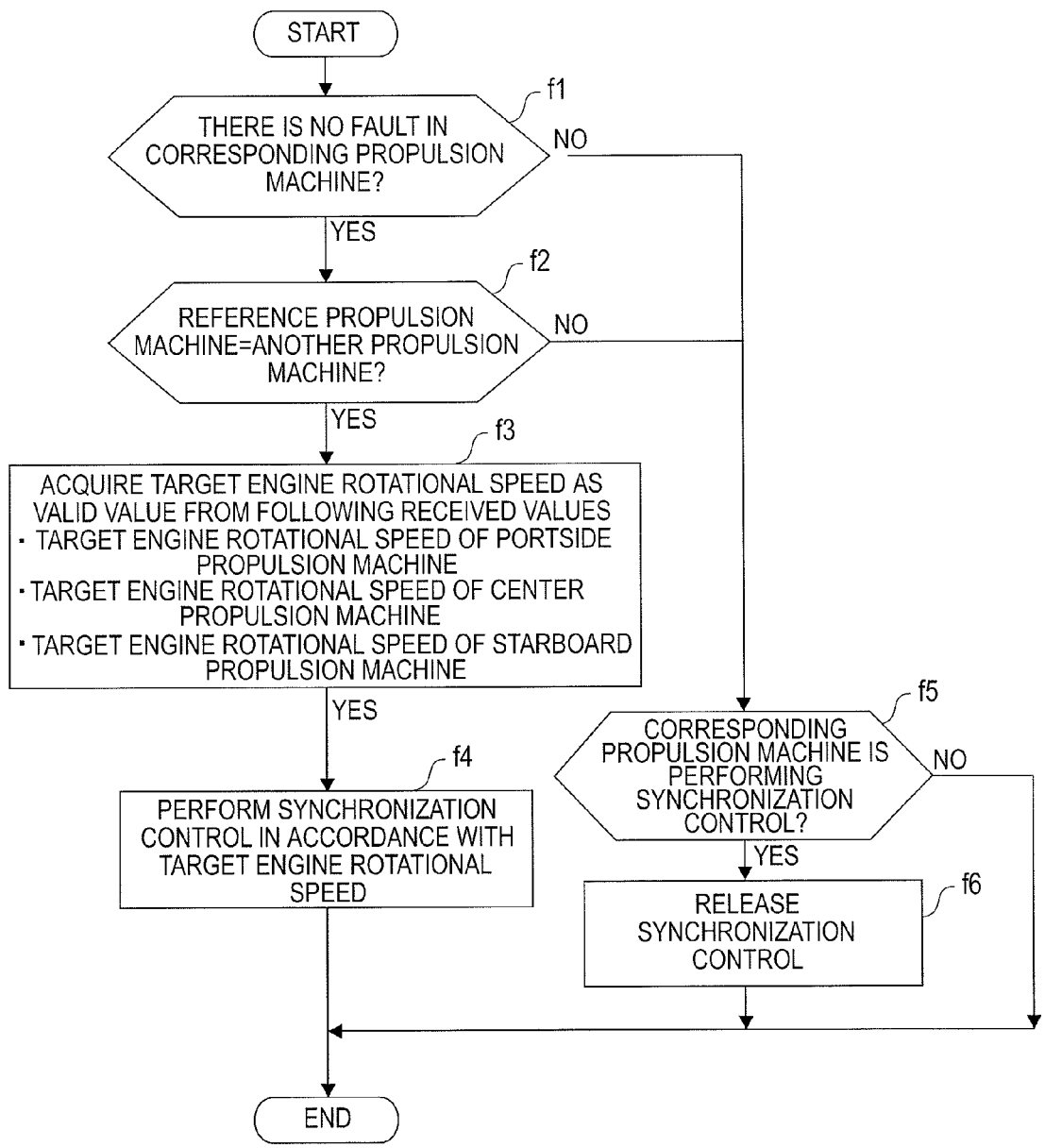
FIG. 9 is a flowchart of a synchronization control section according to Embodiment 1 of the invention.
Figure 10:
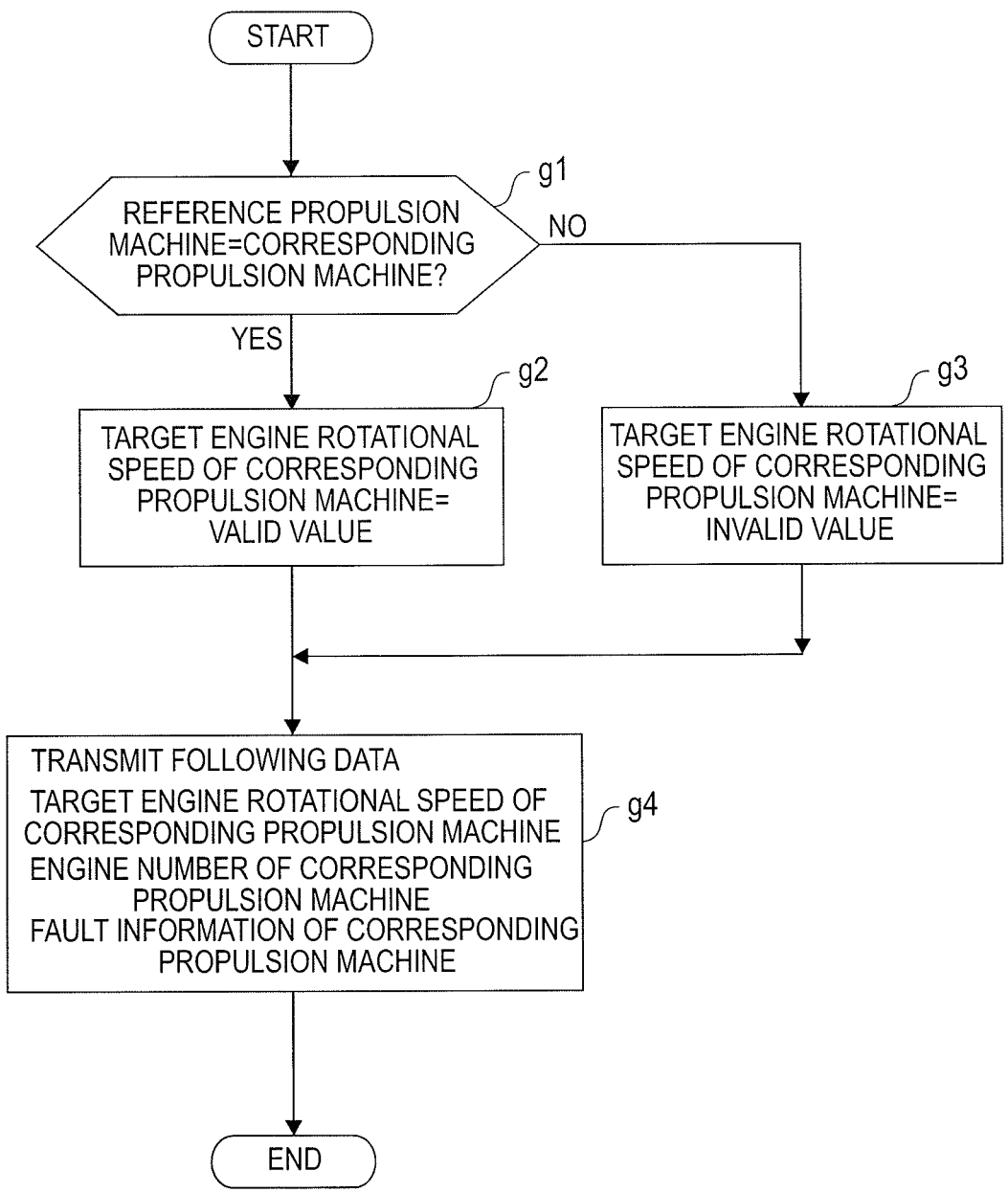
FIG. 10 is a flowchart of a transmitting section according to Embodiment 1 of the invention.

Hereinafter, control for switching a propulsion machine as a control reference will be described with reference to FIGS. 3 to 10. FIG. 3 is a diagram showing the configuration of an engine control section. FIG. 4 is a flowchart of an initialization section of the engine control section. FIG. 5 is a flowchart of a receiving section of the engine control section. FIG. 6 is a flowchart of a propulsion machine installation position determination section of the engine control section. FIG. 7 is a flowchart of a propulsion machine connection determination section of the engine control section. FIG. 8 is a flowchart of a control reference propulsion machine determination section of the engine control section. FIG. 9 is a flowchart of a synchronization control section of the engine control section. FIG. 10 is a flowchart of a transmitting section of the engine control section.

First, the configuration of the engine control section will be described with reference to FIG. 3. Hereinafter, although the engine control section 5L of the portside propulsion machine 2L will be described representatively, the engine control sections 5M and 5R of the center propulsion machine 2M and the starboard propulsion machine 2R have the same configuration.

A control device of the propulsion machine 2L (2M, 2R) performs initialization processing in an initialization section 30 after activated. Next, in a receiving section 31, it is determined whether or not information received through the communication line 3 is received from the propulsion machine 2L (2M, 2R), and processing is performed for resetting a connection determination timer (a portside propulsion machine connection determination timer, a center propulsion machine connection determination timer, or a starboard propulsion machine connection determination timer) corresponding to the determined propulsion machine.

Thereafter, in a propulsion machine installation position determination section 32, when information from the communication device 8 is received, an engine number is acquired by a received value from the communication device 8 and stored in the nonvolatile memory 7L (7M, 7R).

When information from the communication device 8 is not received, an engine number is determined by an input voltage from the engine installation position detection terminal 6L (6M, 6R) and stored in the nonvolatile memory 7L (7M, 7R). Thereafter, in a propulsion machine connection determination section 33, it is determined whether or not each of the propulsion machines 2L, 2M, and 2R is connected to the communication line 3. Thereafter, in a control reference propulsion machine determination section 34, it is determined whether a propulsion machine as a control reference is the corresponding propulsion machine or another propulsion machine. Thereafter, in the synchronization control section 35, it is determined whether or not synchronization control is performed. At the time of starting and releasing the synchronization control, a control value is corrected such that an operation in switching a reference propulsion machine is not unstable.

Finally, in a transmitting section 36, it is determined which of a valid value and an invalid value of the target engine rotational speed is transmitted. Thereafter, the target engine rotational speed of the corresponding propulsion machine, the engine number of the corresponding propulsion machine, and fault information of the corresponding propulsion machine are transmitted.

Next, an example of initialization processing will be described with reference to the flowchart of the initialization section 30 of FIG. 4.

In Step a1, the initial values of the portside propulsion machine connection determination timer, the center propulsion machine connection determination timer, and the starboard propulsion machine connection determination timer which are the output of the receiving section 31 are set, and the processing progresses to Step a2.

In Step a2, the determination result initial values of portside propulsion machine connection determination, center propulsion machine connection determination, and starboard propulsion machine connection determination which are the output of the propulsion machine connection determination section 33 are set to "non-connection" and the processing progresses to Step a3.

In Step a3, a reference propulsion machine determination result initial value which is the output of the control reference propulsion machine determination section 34 is set to "another propulsion machine", and the processing progresses to Step a4. In Step a4, a target engine rotational speed initial value which is the output of the transmitting section 36 is set to an invalid value, and the processing ends.

Next, an example of processing for analyzing received information will be described with reference to the flowchart of the receiving section 31 of FIG. 5.

In Step b1, the portside propulsion machine connection determination timer, the center propulsion machine connection determination timer, and the starboard propulsion machine connection determination timer are subtracted, and the processing progresses to Step b2. However, when the timer=0, subtraction for preventing underflow is not performed and the processing progresses to Step b2.

In Step b2, it is determined whether or not received information from the communication line 3 is output from the portside propulsion machine. If the received information is output from the portside propulsion machine, in Step b3, the portside propulsion machine connection determination timer is reset to the initial value, and the target engine rotational speed, the engine number, and fault information of the portside propulsion machine are acquired. Then, the processing progresses to Step b4. If the received information from the communication line 3 is not output from the portside propulsion machine, no operation is carried out, and the processing progresses to Step b4.

In Step b4, it is determined whether or not received information from the communication line 3 is output from the center propulsion machine. If the received information is output from the center propulsion machine, in Step b5, the center propulsion machine connection determination timer is reset to the initial value, and the target engine rotational speed, the engine number, and fault information of the center propulsion machine are acquired. Then, the processing progresses to Step b6. If the received information received from the communication line 3 is not output from the center propulsion machine, no operation is carried out, and the processing progresses to Step b6.

In Step b6, it is determined whether or not received information from the communication line 3 is output from the starboard propulsion machine. If the received information is output from the starboard propulsion machine, in Step b7, the starboard propulsion machine connection determination timer is reset to the initial value, and the target engine rotational speed, the engine number, and fault information of the starboard propulsion machine are acquired. Then, the processing ends. If the received information from the communication line 3 is not output from the starboard propulsion machine, no operation is carried out, and the processing ends.

Next, an example of processing for determining the installation position of a propulsion machine will be described with reference to the flowchart of the propulsion machine installation position determination section 32 of FIG. 6.

In Step c1, it is determined whether or not information is received from the communication device 8. When it is determined that information from the communication device 8 is received, the processing progresses to Step c2. When it is determined that information is not received, the processing progresses to Step c8.

In Step c2, it is determined whether or not an engine number is received from the communication device 8.

If an engine number is received, the processing progresses to Step c3. If an engine number is not received, the processing progresses to Step c4.

In Step c3, an engine number reception completion flag is set to "received", and the processing progresses to Step c5. In Step c4, the engine number reception completion flag is set to "unreceived", and the processing progresses to Step c5. In Step c5, it is determined whether or not the engine number reception completion flag is "received". If the engine number reception completion flag is "received", the processing progresses to Step c6. If the engine number reception completion flag is not "received", the processing returns to Step c1.

In Step c6, the engine number of the corresponding propulsion machine is set to the engine number received from the communication device 8, and the processing progresses to Step c7. In Step c7, the engine number of the corresponding propulsion machine set in Step c6 is stored in the nonvolatile memory 7L (7M, 7R), and the processing progresses to Step c8. In Step c8, the engine number of the corresponding propulsion machine is read from the nonvolatile memory 7L (7M, 7R). In Step c9, it is determined whether or not the read engine number of the corresponding propulsion machine is a value at the time of shipment of the control device.

In Step c9, if the read value of the engine number of the corresponding propulsion machine read in Step c8 is the value at the time of shipment of the control device, it is determined that the engine number is not learned, and the processing progresses to Step c10. If the read value of the engine number is not the value at the time of shipment of the control device, it is determined that the engine number is learned, and the processing progresses to Step c18. In Step c18, the engine number of the corresponding propulsion machine is set to the read value from the nonvolatile memory 7L (7M, 7R), and the processing ends.

In Step c10, if the input voltage from the engine installation position detection terminal 6L (6M, 6R) is equal to or greater than the portside propulsion machine determination lower limit value and smaller than the portside propulsion machine determination upper limit value, it is determined that the installation position of the corresponding propulsion machine is portside. Then, in Step c11, the engine number of the corresponding propulsion machine is set to the portside propulsion machine (0), and the processing progresses to Step c12.

If the condition of Step c10 is not established, it is determined that the installation position of the corresponding propulsion machine is not portside, and the processing progresses to Step c13.

In Step c13, if the input voltage from the engine installation position detection terminal 6L (6M, 6R) is equal to or greater than the center propulsion machine determination lower limit value and smaller than the center propulsion machine determination upper limit value, it is determined that the installation position of the corresponding propulsion machine is center. Then, in Step c14, the engine number of the corresponding propulsion machine is set to the center propulsion machine (1), and the processing progresses to Step c12.

If the condition of Step c13 is not established, it is determined that the installation position of the corresponding propulsion machine is not center, and the processing progresses to Step c15.

In Step c15, if the input voltage from the engine installation position detection terminal 6L (6M, 6R) is equal to or greater than the starboard propulsion machine determination lower limit value and smaller than the starboard propulsion machine determination upper limit value, it is determined that the installation position of the corresponding propulsion machine is starboard. Then, in Step c16, the engine number of the corresponding propulsion machine is set to the starboard propulsion machine (2), and the processing progresses to Step c12.

If the condition of Step c15 is not established, it is determined that the installation position of the corresponding propulsion machine is not portside/center/starboard. Then, in Step c17, it is determined as error processing that the engine number of the corresponding propulsion machine is the portside propulsion machine (0), but the engine number of the corresponding propulsion machine is not stored in the nonvolatile memory 7L (7M, 7R) and the processing ends. Although in Embodiment 1, the engine number is defined such that the portside propulsion machine is set to "0", the center propulsion machine is set to "1", and the starboard propulsion machine is set to "2", the engine number may be set to an arbitrary value based on a combination of the portside propulsion machine<the center propulsion machine<the starboard propulsion machine.

Next, an example of processing for determining the connection states of the propulsion machines 2L, 2M, and 2R will be described with reference to the flowchart of the propulsion machine connection determination section 33 of FIG. 7.

In Step d1, it is determined whether or not the portside propulsion machine connection determination timer is 0. When the portside propulsion machine connection determination timer is 0, it is determined that a portside propulsion machine connection timeout determination time elapses. Then, in Step d2, the portside propulsion machine connection determination result is set to "non-connection", and the processing progresses to Step d4. When the portside propulsion machine connection determination timer is not 0, it is determined that the portside propulsion machine connection timeout determination time does not elapse. Then, in Step d3, the portside propulsion machine connection determination result is set to "connection", and the processing progresses to Step d4.

In Step d4, it is determined whether or not the center propulsion machine connection determination timer is 0. When the center propulsion machine connection determination timer is 0, it is determined that a center propulsion machine connection timeout determination time elapses. Then, in Step d5, the center propulsion machine connection determination result is set to "non-connection", and the processing progresses to Step d7. When the center propulsion machine connection determination timer is not 0, it is determined that the center propulsion machine connection timeout determination time does not elapse. Then, in Step d6, the center propulsion machine connection determination result is set to "connection", and the processing progresses to Step d7.

In Step d7, it is determined whether or not the starboard propulsion machine connection determination timer is 0. When the starboard propulsion machine connection determination timer is 0, it is determined that a starboard propulsion machine connection timeout determination time elapses. Then, in Step d8, the starboard propulsion machine connection determination result is set to "non-connection", and the processing ends. When the starboard propulsion machine connection determination timer is not 0, it is determined that the starboard propulsion machine connection timeout determination time does not elapse. Then, in Step d9, the starboard propulsion machine connection determination result is set to "connection", and the processing ends.

Next, an example of processing for determining a propulsion machine as a control reference will be described with reference to the flowchart of the control reference propulsion machine determination section 34 of FIG. 8.

In Step e1, it is determined whether or not one of the reference propulsion machine SWs 4L, 4M, and 4R is ON. When one of the reference propulsion machine SWs 4L, 4M, and 4R is ON, it is determined that there is a reference propulsion machine switching instruction from a user, and in Step e2, it is determined whether or not the reference propulsion machine SW to the corresponding propulsion machine is ON.

When all the reference propulsion machine SWs 4L, 4M, and 4R are not ON, it is determined that there is no reference propulsion machine switching instruction from the user, and the processing progresses to Step e6.

In Step e2, when the reference propulsion machine SW of the corresponding propulsion machine is ON, in Step e3, it is determined whether or not a fault occurs in the corresponding propulsion machine. When the reference propulsion machine SW to the corresponding propulsion machine is not ON, in Step e5, it is determined that the reference propulsion machine is "another propulsion machine", and the processing ends.

In Step e3, when no fault occurs in the corresponding propulsion machine, in Step e4, it is determined that the reference propulsion machine is "corresponding propulsion machine". When a fault occurs in the corresponding propulsion machine, in Step e5, the reference propulsion machine is "another propulsion machine", and the processing ends.

In Step e6, the engine numbers of all the propulsion machines other than the corresponding propulsion machine in the "connection" state are acquired, and the processing progresses to Step e7. In Step e7, when the minimum value of the engine numbers of the propulsion machines in the "connection" state is smaller than the engine number of the corresponding propulsion machine, the processing progresses to Step e8. If the condition of Step e7 is not established, the processing progresses to Step e12.

In Step e8, when a fault occurs in all the propulsion machines which are in the "connection" state and have the engine number smaller than the engine number of the corresponding propulsion machine, the processing progresses to Step e9. If the condition of Step e8 is not established, in Step e11, it is determined that the reference propulsion machine is "another propulsion machine", and the processing ends.

In Step e9, when no fault occurs in the corresponding propulsion machine, in Step e10, it is determined that the reference propulsion machine is "corresponding propulsion machine", and the processing ends. When a fault occurs in the corresponding propulsion machine, in Step e11, it is determined that the reference propulsion machine is "another propulsion machine", and the processing ends.

In Step e12, when a fault occurs in the corresponding propulsion machine, it is determined that the corresponding propulsion machine cannot become the reference propulsion machine. Then, in Step e14, it is determined that the reference propulsion machine is "another propulsion machine", and the processing ends. If no fault occurs in the corresponding propulsion machine, in Step e13, it is determined that the reference propulsion machine is "corresponding propulsion machine", and the processing ends. Although in Embodiment 1, as described above, the reference propulsion machine switching instruction from the operator is detected by a switch input, the reference propulsion machine switching instruction from the operator may be detected by, for example, a reference propulsion machine switching instruction value received from the communication device 8. In this case, the condition of Step e1 may be substituted with "the reference propulsion machine switching instruction value is received from the communication device 8?", and the condition of Step e2 may be substituted with "a reference propulsion machine switching instruction to the corresponding propulsion machine?".

Next, an example of processing for determining the start and end of synchronization control will be described with reference to the flowchart of the synchronization control section 35 of FIG. 9.

In Step f1, it is determined whether or not a fault occurs in the corresponding propulsion machine. When a fault occurs in the corresponding propulsion machine, it is determined that synchronization control cannot be performed, and the processing progresses to Step f5. When no fault occurs in the corresponding propulsion machine, it is determined that synchronization control can be performed, and the processing progresses to Step f2. In Step f2, it is determined whether or not the reference propulsion machine determination result in the control reference propulsion machine determination section 34 is "another propulsion machine".

When the reference propulsion machine determination result is "another propulsion machine", it is determined that the corresponding propulsion machine is not the reference propulsion machine, and the processing progresses to Step f3. When the reference propulsion machine determination result is not "another propulsion machine", it is determined that the corresponding propulsion machine is the reference propulsion machine, and the processing progresses to Step f5. In Step f3, the target engine rotational speed as a valid value from "target engine rotational speed of portside propulsion machine", "target engine rotational speed of center propulsion machine", and "target engine rotational speed of starboard propulsion machine" received by the receiving section 31 is acquired, in Step f4, synchronization control is performed in accordance with the target engine rotational speed as a valid value, and the processing ends. Meanwhile, in Step f5, it is determined whether or not the corresponding propulsion machine is performing synchronization control. When the corresponding propulsion machine is performing synchronization control, in Step f6, synchronization control is released and the processing ends.

When the corresponding propulsion machine is not performing synchronization control, no operation is carried out, and the processing ends.

Finally, an example of processing for transmitting a target engine rotational speed will be described with reference to the flowchart of the transmitting section 36 of FIG. 10.

In Step g1, it is determined whether or not the reference propulsion machine determination result in the control reference propulsion machine determination section 34 is the corresponding propulsion machine. When the reference propulsion machine is the corresponding propulsion machine, in Step g2, a valid value, that is, an averaged engine rotational speed as a synchronization target calculated by the corresponding propulsion machine is set as the target engine rotational speed, and the processing progresses to Step g4. When the reference propulsion machine is another propulsion machine, in Step g3, an invalid value is set as the target engine rotational speed, and the processing progresses to Step g4.

In Step g4, the target engine rotational speed of the corresponding propulsion machine, the engine number of the corresponding propulsion machine, and the fault information of the corresponding propulsion machine set in Step g2 or g3 are transmitted to the propulsion machines other than the corresponding propulsion machine through the communication line 3.

Although in Embodiment 1, synchronization control of the engine rotational speed has been described as an example, the invention also relates to synchronization control of a throttle opening degree, a shift position, or the like, and is not limited to the engine rotational speed. The invention also relates to another engine control, and is not limited to the above-described synchronization control.

As described above, in the control device for a propulsion machine according to Embodiment 1 of the invention, with the above-described configuration, the following excellent functional effects are obtained.

A propulsion machine as a control reference can be switched such that the corresponding propulsion machine or another propulsion machine becomes a control reference in accordance with the operating states of the propulsion machines. For this reason, a propulsion machine of a synchronization target can be continuously controlled in accordance with a propulsion machine as a new control reference.

Therefore, even when a propulsion machine cannot maintain the state as a control reference, for example, even when a fault occurs in a propulsion machine as a control reference, or the like, the control reference is switched such that another propulsion machine becomes a control reference. Therefore, a propulsion machine as a synchronization target can be continuously controlled in accordance with a propulsion machine as a new control reference.

When the operator wants to switch the control reference to an arbitrary propulsion machine, the operator operates a switch, a communication device, or the like to provide an instruction to switch the propulsion machine as a control reference to each propulsion machine, such that the propulsion machine as a control reference can be switched in accordance with the operator's intention.

It is determined that a propulsion machine having the minimum engine number from the engine number of the corresponding propulsion machine and the engine numbers received from the propulsion machines other than the corresponding propulsion machine is a propulsion machine as a control reference, making it possible to autonomically switch the propulsion machine as a control reference.

Information for determining the priority of the corresponding propulsion machine as a control reference is determined by the input from the installation position detection terminal provided in the control device, making it possible to determine the priority of the corresponding propulsion machine.

It is also possible to obtain information for determining the priority of the corresponding propulsion machine as a reference propulsion machine by the received value from the communication device.

Information for determining the priority of the corresponding propulsion machine as a control reference is stored in the nonvolatile memory, such that the information can be read from the nonvolatile memory at the time of next activation, and the priority of the corresponding propulsion machine as a control reference can be determined from the information.

Embodiment 2

Figure 11:
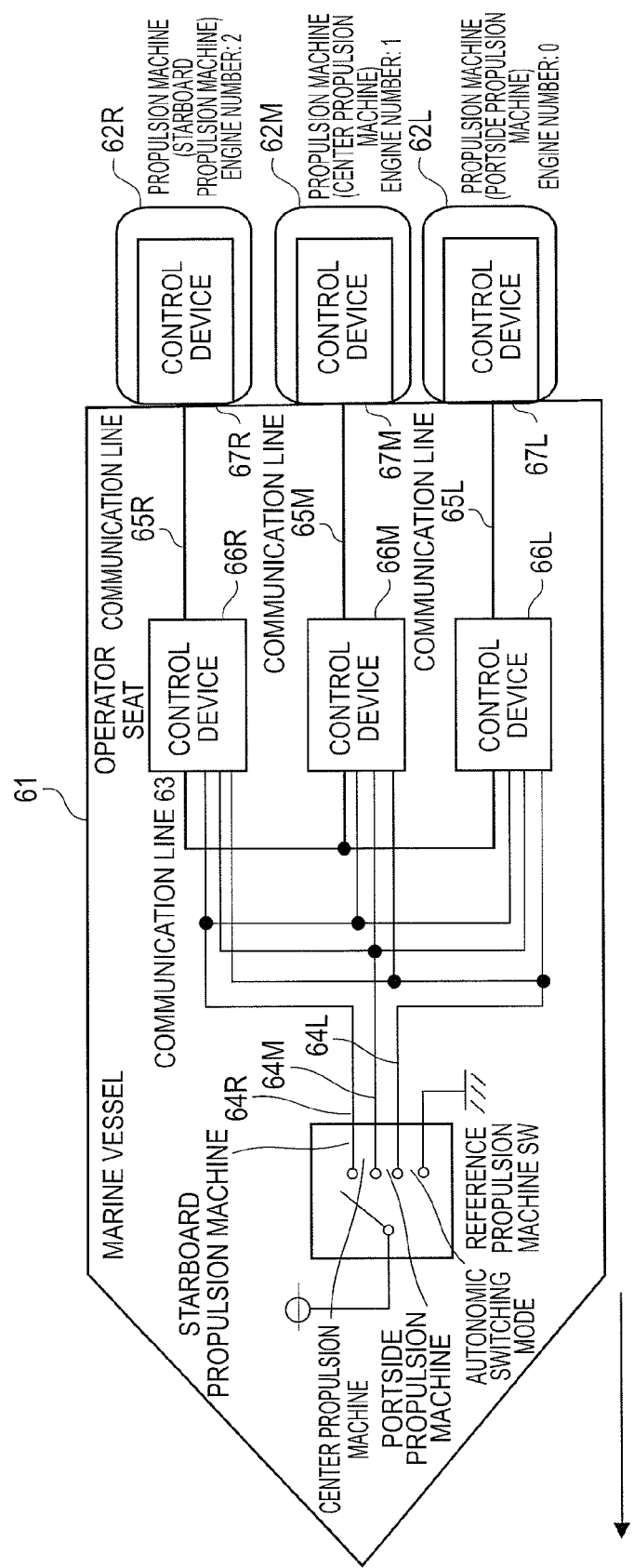
FIG. 11 is a schematic top view of a marine vessel which includes a control device for a propulsion machine according to Embodiment 2 of the invention.

FIG. 11 is a schematic top view of a marine vessel which includes a control device for a propulsion machine according to Embodiment 2 of the invention. FIG. 11 shows a form of so-called DBW (Drive-By-Wire) in which control devices on an operator seat side and control devices for propulsion machines are electrically connect to each other one to one, and mechanical connection is not required.

Although in Embodiment 2, the marine vessel has three propulsion machines mounted in a hull thereof, a plurality (for example, two or more) of propulsion machines may be mounted. Although in Embodiment 2, an outboard motor is used as a propulsion machine, a stern drive or an inboard/outboard motor may be used.

For description, a propulsion machine which is disposed on the left side with respect to a forward drive direction of a marine vessel 61 indicated by an arrow of FIG. 11 is called as a portside propulsion machine 62L, a propulsion machine which is disposed on the right side is called a starboard propulsion machine 62R, and a propulsion machine which is disposed at the center is called a center propulsion machine 62M.

In the control device for a propulsion machine of Embodiment 2, the control devices of the propulsion machines 2L, 2M, and 2R of Embodiment 1 are substituted with operator seat-side control devices 66L, 66M, and 66R and stern-side control devices 67L, 67M, and 67R described below.

In FIG. 11, the control devices 66L, 66M, and 66R are provided on the operator seat side of the marine vessel 61, and the control devices are connected to each other through a communication line 63. The propulsion machines 62L, 62M, and 62R are respectively provided with the control devices 67L, 67M, and 67R. The control device 66L and the control device 67L are connected to each other through a communication line 65L. The control device 66M and the control device 67M are connected to each other through a communication line 65M. The control device 66R and the control device 67R are connected to each other through a communication line 65R.

Reference propulsion machine SWs (switches) 64L, 64M, and 64R which are used to detect which propulsion machine is selected as a control reference by the operator are respectively connected to the control devices 66L, 66M, and 66R on the operator seat side. The reference propulsion machine SW 64L is an SW (switch) which is used to detect that the propulsion machine 62L is selected as a reference propulsion machine. The reference propulsion machine SW 64M is an SW which is used to detect that the propulsion machine 62M is selected as a reference propulsion machine. The reference propulsion machine SW 64R is an SW which is used to detect that the propulsion machine 62R is selected as a reference propulsion machine.

Although in Embodiment 2, the reference propulsion machine SWs 64L, 64M, and 64R are SWs in which a pull-up state is ON, as in Embodiment 1, SWs may be used in which a state other than the above-described state is ON. As described above, although in Embodiment 2, an example will be described where the SWs can select all the three propulsion machines provided in the marine vessel 61 as a reference propulsion machine, as in Embodiment 1, for example, one or two of the reference propulsion machine SWs 64L, 64M, and 64R may be connected to corresponding propulsion machines. Although in Embodiment 2, as described above, the reference propulsion machine switching instruction from the operator is detected by the switch input, as in Embodiment 1, the reference propulsion machine switching instruction from the operator may be detected by a reference propulsion machine switching instruction value received from a communication device 68 (see FIG. 12).

Figure 12:
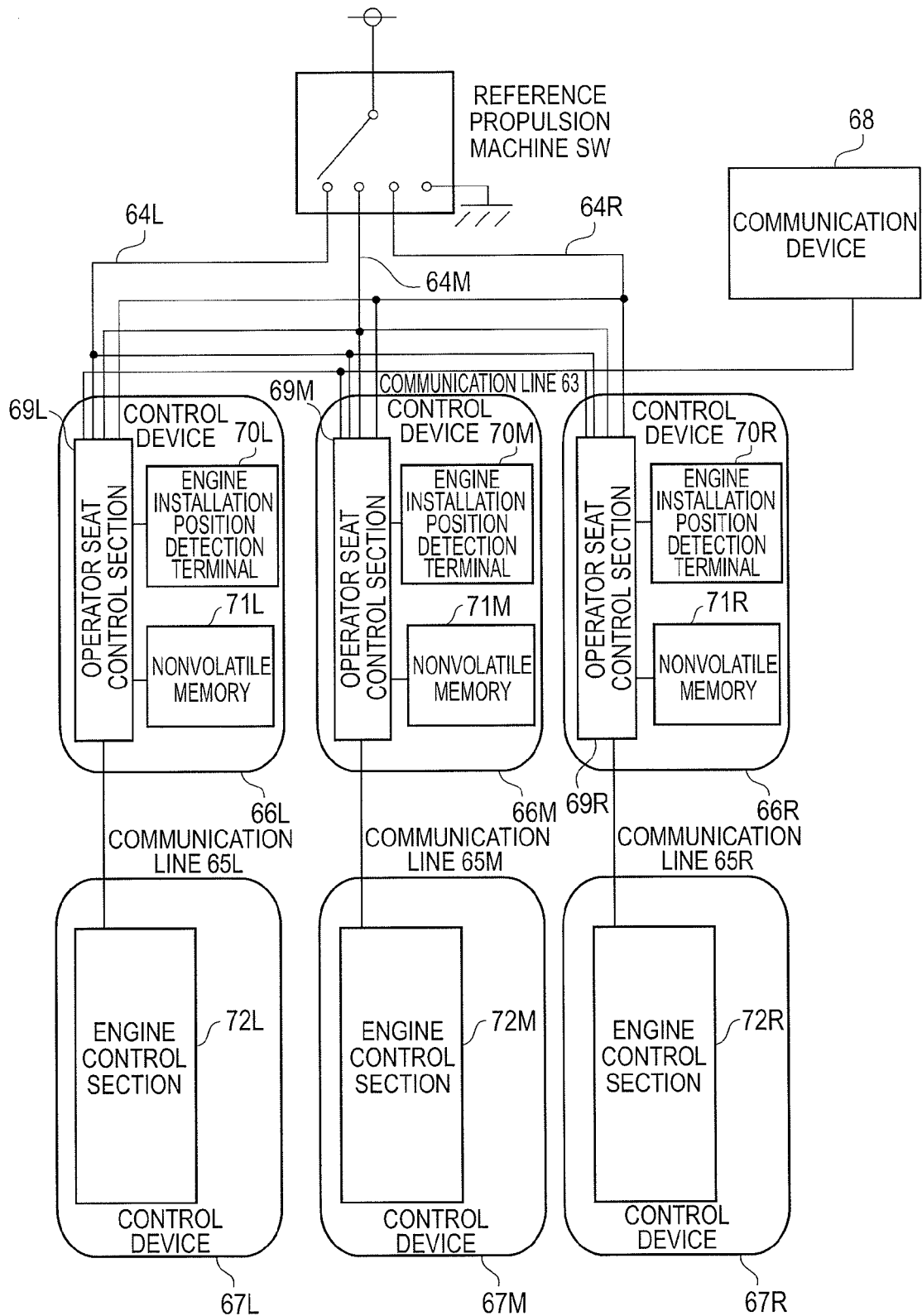
FIG. 12 is a system diagram of a control device for a propulsion machine according to Embodiment 2 of the invention.

FIG. 12 is a system diagram of the control devices of the propulsion machines 62L, 62M, and 62R in FIG. 11.

An operator seat control section 69L provided in the control device 66L reads an engine number from a nonvolatile memory 71L, and when the engine number read value is a value at the time of shipment of the control device, determines that the engine number is not learned. When the engine number is not learned, if a voltage value (A/D) input from an engine installation position detection terminal 70L is in a range of a portside propulsion machine determination voltage (equal to or greater than a portside propulsion machine determination lower limit value and smaller than a portside propulsion machine determination upper limit value), it is determined that the installation position of the corresponding propulsion machine is left, and the engine number corresponding to the installation position on the left side is obtained. The engine number determined by the engine installation position detection terminal 70L is stored in the nonvolatile memory 71L.

An operator seat control section 69R provided in the control device 66R reads an engine number from a nonvolatile memory 71R, and when the engine number read value is a value at the time of shipment of the control device, determines that the engine number is not learned. When the engine number is not learned, if a voltage value (A/D) input from an engine installation position detection terminal 70R is in a range of a starboard propulsion machine determination voltage (equal to or greater than a starboard propulsion machine determination lower limit value and smaller than a starboard propulsion machine determination upper limit value), it is determined that the installation position of the corresponding propulsion machine is right, and the engine number corresponding to the installation position on the right side is obtained. The engine number determined by the engine installation position detection terminal 70R is stored in the nonvolatile memory 71R.

An operator seat control section 69M provided in the control device 66M reads an engine number from a nonvolatile memory 71M, and when the engine number read value is a value at the time of shipment of the control device, determines that the engine number is not learned. When the engine number is not learned, if a voltage value (A/D) input from an engine installation position detection terminal 70M is in a range of a center propulsion machine determination voltage (equal to or greater than a center propulsion machine determination lower limit value and smaller than a center propulsion machine determination upper limit value), it is determined that the installation position of the corresponding propulsion machine is center, and the engine number corresponding to the installation position at the center is obtained. The engine number determined by the engine installation position detection terminal 70M is stored in the nonvolatile memory 71M.

In Embodiment 2, as in Embodiment 1, it is determined that a propulsion machine having the minimum engine number from the propulsion machines 62L, 62M, and 62R is a propulsion machine as a control reference. For this reason, the engine number of the portside propulsion machine is set to "0", the engine number of the center propulsion machine is set to "1", and the engine number of the starboard propulsion machine is set to "2", such that a portside propulsion machine has higher priority as a control reference. Meanwhile, the engine number of the portside propulsion machine may be set to "2", the engine number of the center propulsion machine may be set to "1", and the engine number of the starboard propulsion machine may be set to "0", such that a propulsion machine on the starboard-most side becomes a propulsion machine as a control reference. Alternatively, the engine number of the portside propulsion machine may be set to "1", the engine number of the center propulsion machine may be set to "0", and the engine number of the starboard propulsion machine may be set to "2", such that a propulsion machine on the centermost side becomes a propulsion machine as a control reference. With regard to the priority as a control reference, it may be determined that a propulsion machine having a maximum engine number or a centermost value has highest priority.

In Embodiment 2, as in Embodiment 1, the engine installation position detection terminals 70L, 70M, and 70R are respectively provided in the operator seat control sections 69L, 69M, and 69R of the control devices 66L, 66M, and 66R provided on the operator seat side, and the communication device 68 is provided in the communication line 63. Thus, the engine position can be acquired by both the engine installation position detection terminals 70L, 70M, and 70R and the communication device 68. Meanwhile, either the engine installation position detection terminals 70L, 70M, and 70R or the communication device 68 may be provided.

When an engine number is received from the communication device 68, each of the operator seat control sections 69L, 69M, and 69R of the control devices 66L, 66M, and 66R provided on the operator seat side determines that the engine number is the engine number of the corresponding propulsion machine and stores the engine number in each of the nonvolatile memories 71L, 71M, and 71R. When the engine number is not received from the communication device 68, the engine number read from each of the nonvolatile memories 71L, 71M, and 71R or the engine number determined by each of the engine installation position detection terminals 70L, 70M, and 70R is set to the engine number of the corresponding propulsion machine.

When the communication device 68 is not provided, and only each of the engine installation position detection terminals 70L, 70M, and 70R are provided to constitute a control device, the engine number can be obtained by each of the engine installation position detection terminals 70L, 70M, and 70R. Meanwhile, when the engine installation position detection terminals 70L, 70M, and 70R are not provided, and only the communication device 68 is provided to constitute a control device, the engine number can be obtained from the communication device 68. The communication device 68 may also be used for initially setting the engine number and for relearning an arbitrary value separately customized by a user.

Next, control for switching a propulsion machine as a control reference will be described with reference to FIGS. 13 to 20.

Figure 13:
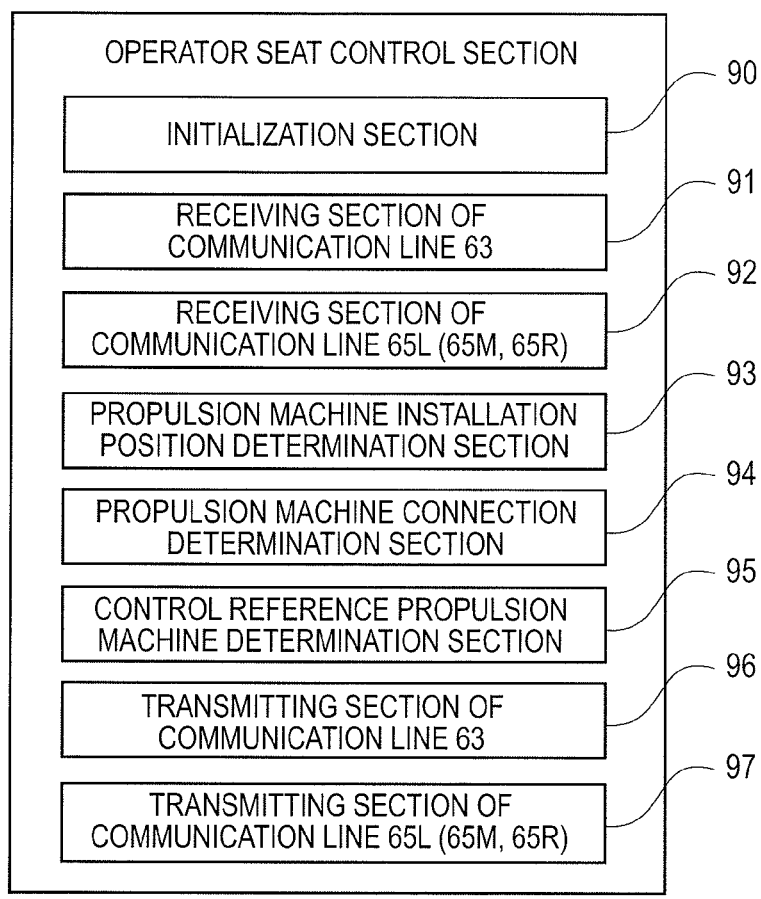
FIG. 13 is a diagram showing the configuration of an operator seat control section and an engine control section according to Embodiment 2 of the invention.
Figure 13:
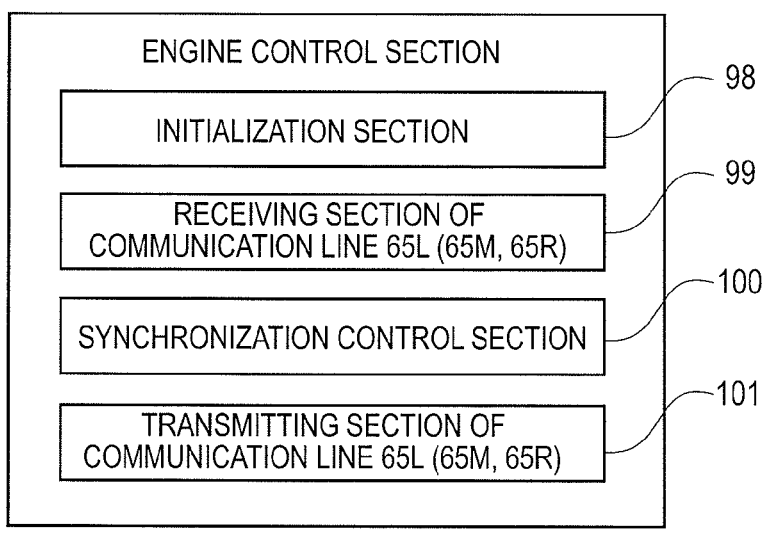
Figure 14:
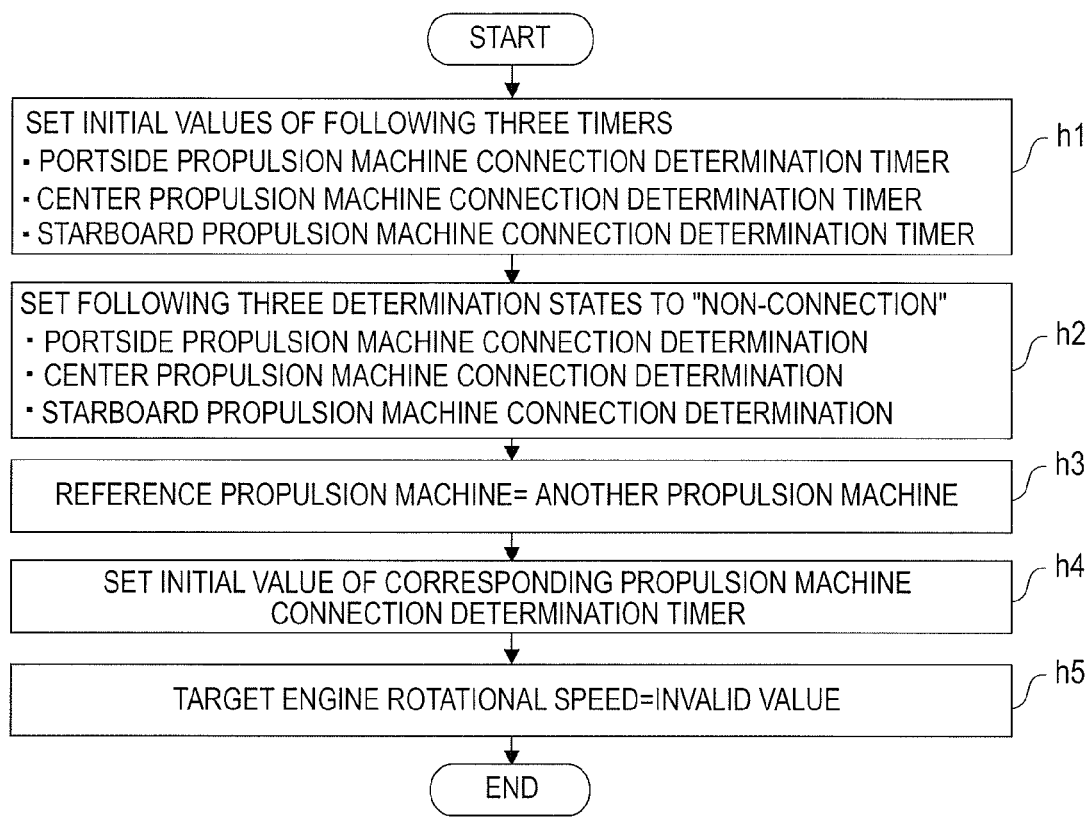
FIG. 14 is a flowchart of an initialization section in an operator seat control section according to Embodiment 2 of the invention.
Figure 15:
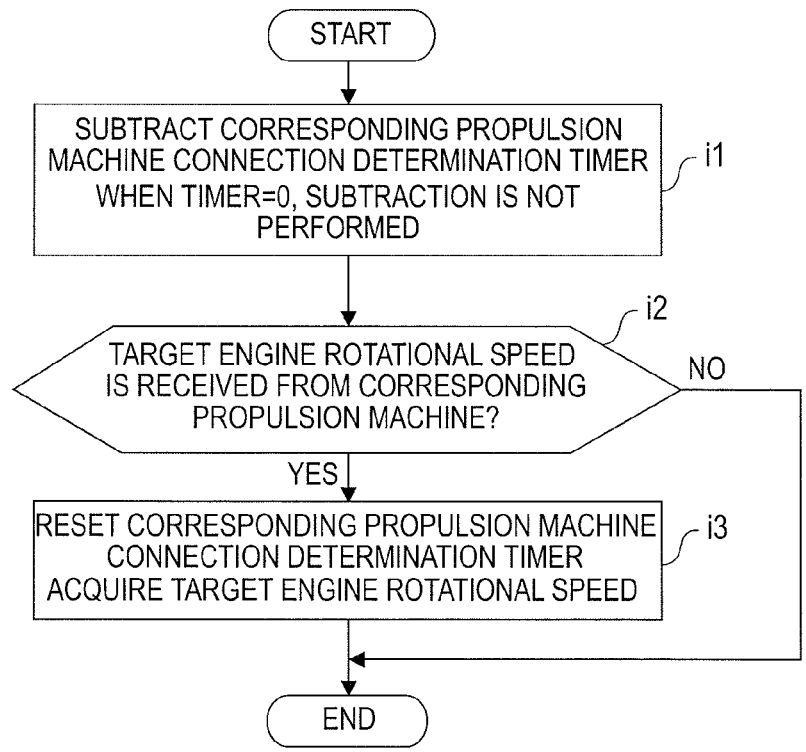
FIG. 15 is a flowchart of a communication line receiving section in an operator seat control section according to Embodiment 2 of the invention.
Figure 16:
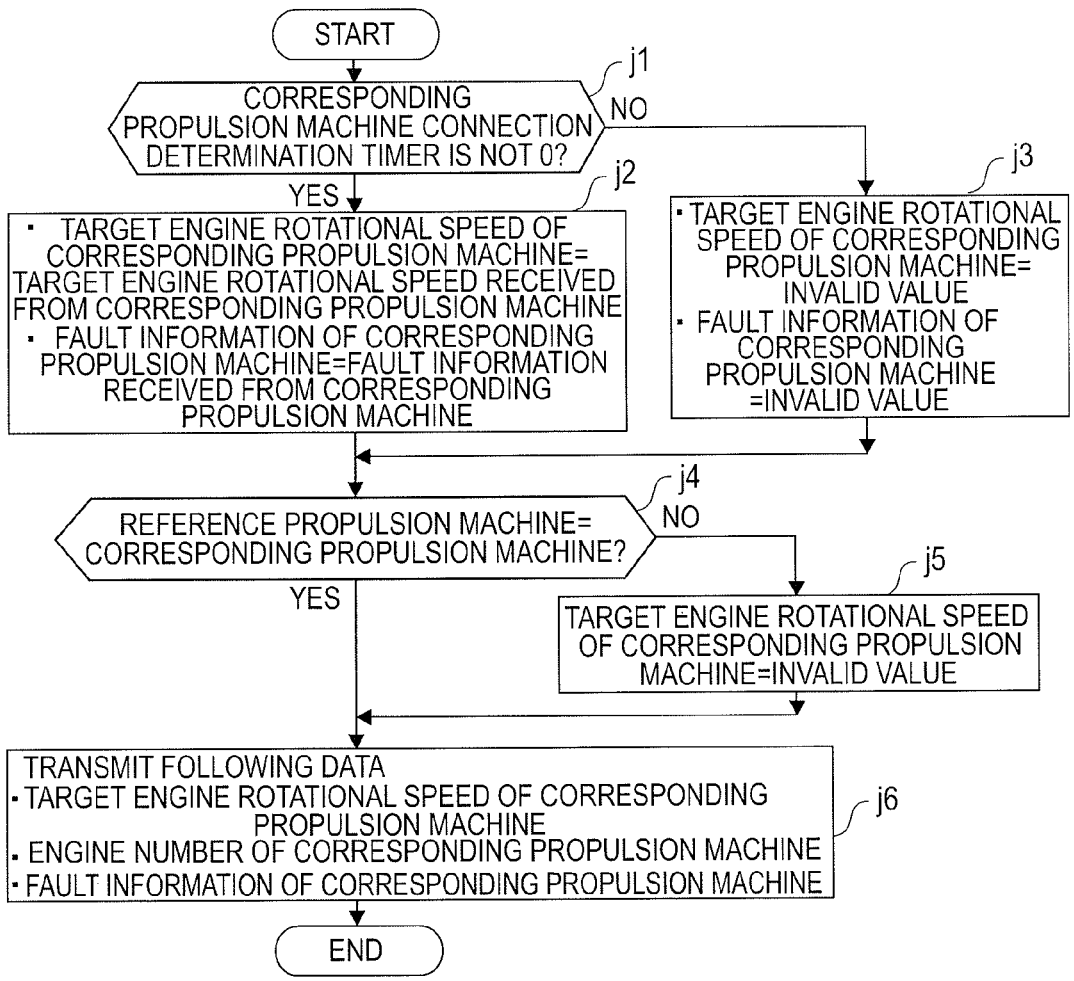
FIG. 16 is a flowchart of a communication line transmitting section in an operator seat control section according to Embodiment 2 of the invention.
Figure 17:
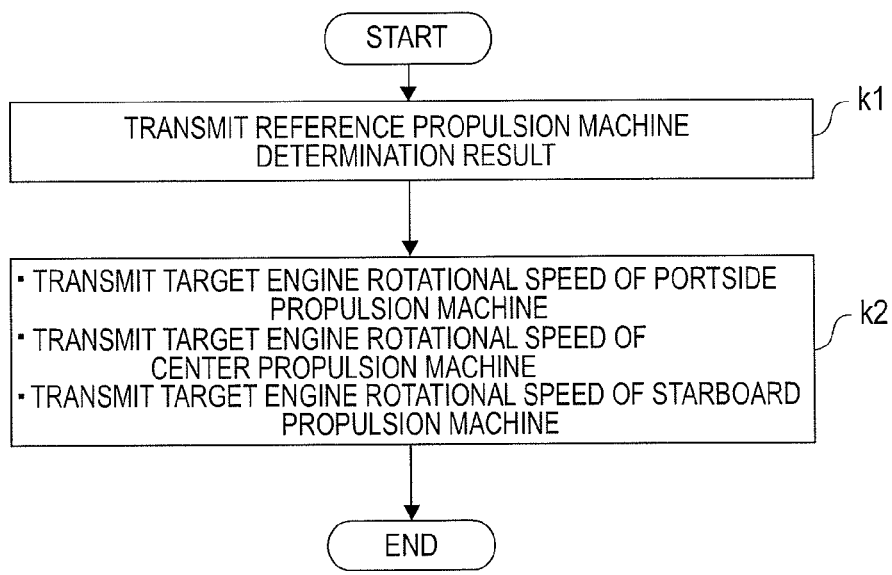
FIG. 17 is a flowchart of a communication line transmitting section according to Embodiment 2 of the invention.
Figure 18:
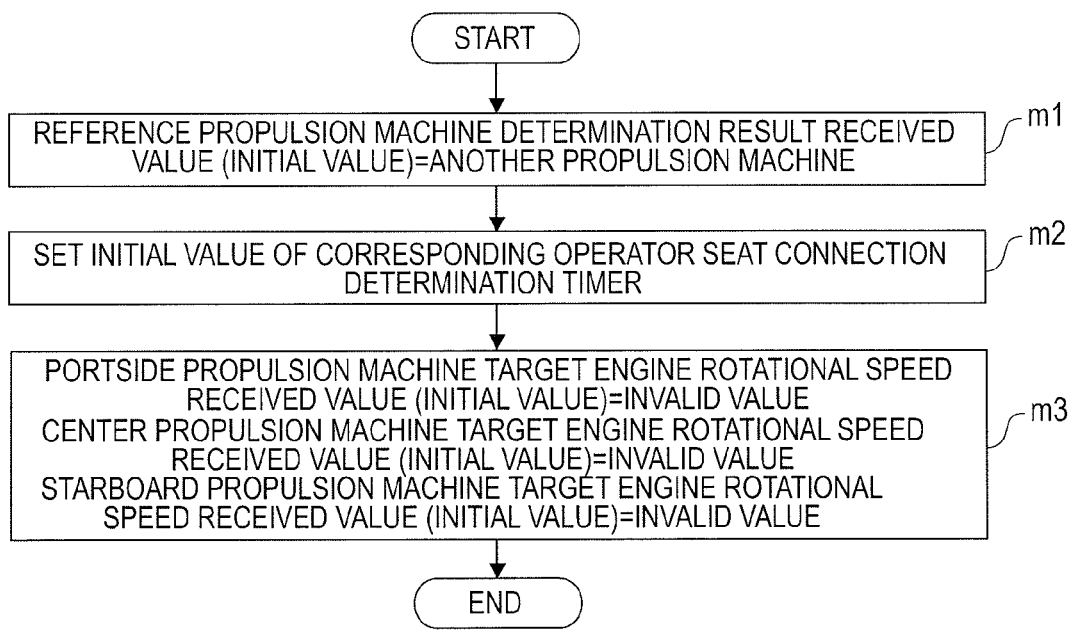
FIG. 18 is a flowchart of an initialization section in an engine control section according to Embodiment 2 of the invention.
Figure 19:
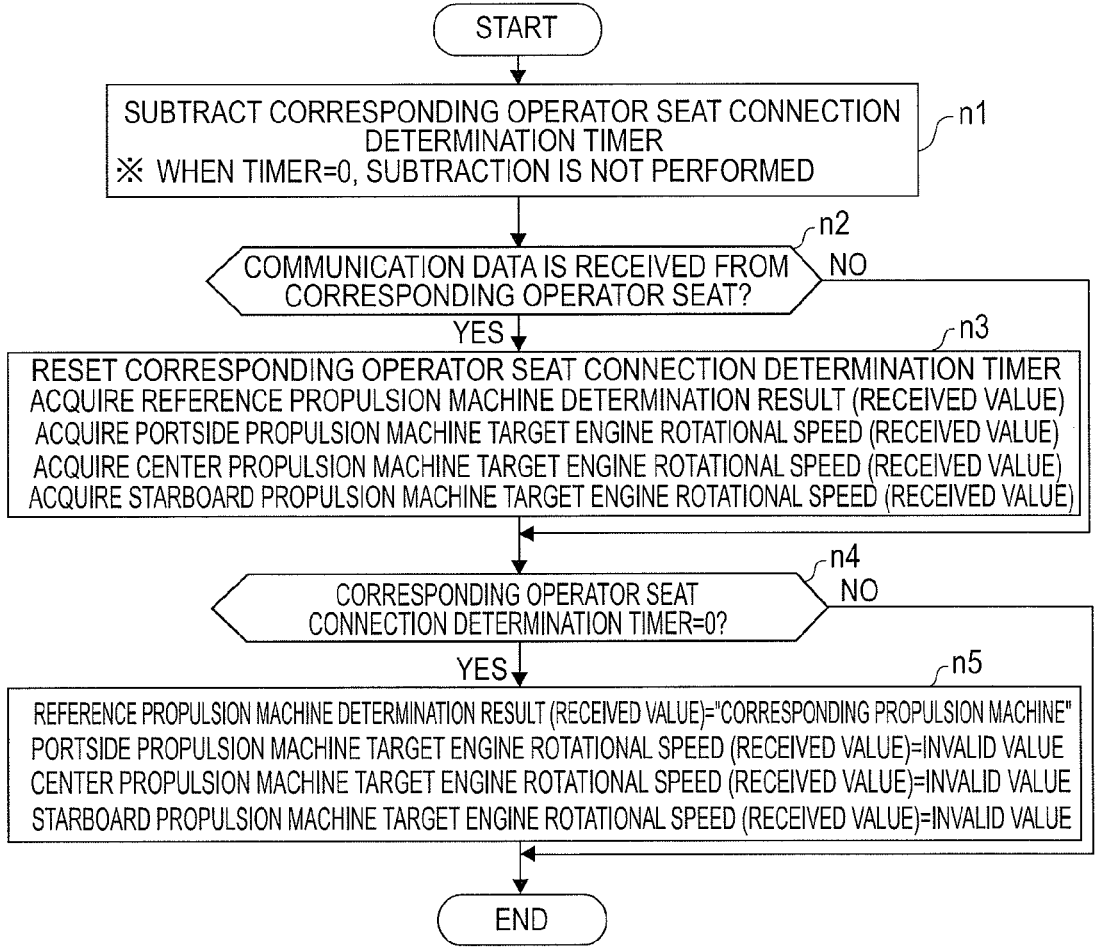
FIG. 19 is a flowchart of a communication line receiving section in an engine control section according to Embodiment 2 of the invention.
Figure 20:
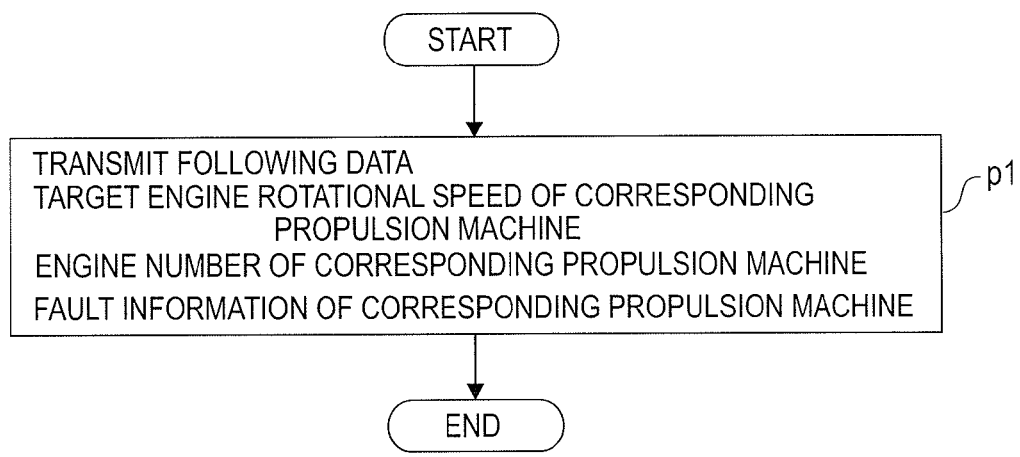
FIG. 20 is a flowchart of a communication line transmitting section in an engine control section according to Embodiment 2 of the invention.

FIG. 13 is a diagram showing the configuration of an operator seat control section and an engine control section. FIG. 14 is a flowchart of an initialization section 90 in the operator seat control section 69L (69M, 69R). FIG. 15 is a flowchart of a receiving section 92 of the communication line 65L (65M, 65R) in the operator seat control section 69L (69M, 69R). FIG. 16 is a flowchart of a transmitting section 96 of the communication line 63 in the operator seat control section 69L (69M, 69R). FIG. 17 is a flowchart of a transmitting section 97 of the communication line 65L (65M, 65R). FIG. 18 is a flowchart of initialization section 98 in an engine control section 72L (72M, 72R). FIG. 19 is a flowchart of a receiving section 99 of the communication line 65L (65M, 65R) in the engine control section 72L (72M, 72R). FIG. 20 is a flowchart of a transmitting section 101 of the communication line 65L (65M, 65R) in the engine control section 72L (72M, 72R).

First, the configuration of the operator seat control section and the engine control section will be described with reference to FIG. 13.

Hereinafter, although the operator seat control section 69L and the engine control section 72L of the portside propulsion machine 62L will be described representatively, the operator seat control sections 69M and 69R and the engine control sections 72M and 72R of the center propulsion machine 62M and the starboard propulsion machine 62R have the same configuration. In Embodiment 2, the initialization section of FIG. 3 in Embodiment 1 is substituted with an initialization section 90 and an initialization section 98 described below.

A receiving section 92 of the communication line 65L (65M, 65R) and a transmitting section 97 of the communication line 65L (65M, 65R) are further provided in the operator seat control section, and a receiving section 99 of the communication line 65L (65M, 65R) and a transmitting section 101 of the communication line 65L (65M, 65R) are further provided in the engine control section.

The control device 66L (66M, 66R) provided in the operator seat performs initialization processing in the initialization section 90 after activation. Next, in a receiving section 91 of the communication line 63, it is determined whether or not information received through the communication line 63 is received from the control device 66L (66M, 66R), and processing is performed for resetting a connection determination timer (a portside propulsion machine connection determination timer, a center propulsion machine connection determination timer, or a starboard propulsion machine connection determination timer) corresponding to the determined propulsion machine. The processing content is equivalent to the receiving section 31 of FIG. 3 in Embodiment 1. Thereafter, in the receiving section 92 of the communication line 65L (65M, 65R), a target engine rotational speed from an engine control section described below is received through the communication line 65L (65M, 65R).

Thereafter, in a propulsion machine installation position determination section 93, when information from the communication device 68 is received, an engine number is acquired by a received value from the communication device 68 and stored in the nonvolatile memory 71L (71M, 71R). When information from the communication device 68 is not received, an engine number is determined by an input voltage from the engine installation position detection terminal 70L (70M, 70R) and stored in the nonvolatile memory 71L (71M, 71R). The processing content is equivalent to the propulsion machine installation position determination section 32 of FIG. 3 in Embodiment 1.

Thereafter, in a propulsion machine connection determination section 94, it is determined whether or not each of the propulsion machines 62L, 62M, and 62R is connected to the communication line 63. The processing content is equivalent to the propulsion machine connection determination section 33 of FIG. 3 in Embodiment 1. Thereafter, in a control reference propulsion machine determination section 95, it is determined whether a propulsion machine as a control reference is the corresponding propulsion machine or another propulsion machine. The processing content is equivalent to the control reference propulsion machine determination section 34 of FIG. 3 in Embodiment 1.

Thereafter, in the transmitting section 96 of the communication line 63, the target engine rotational speed received from the corresponding propulsion machine and fault information received from the corresponding propulsion machine are transmitted, and the engine number of the corresponding propulsion machine is transmitted.

Finally, in a transmitting section 97 of the communication line 65L (65M, 65R), it is determined which of a valid value and an invalid value of the target engine rotational speed is transmitted, and the target engine rotational speed is transmitted to the control device 67L (67M, 67R) of the corresponding propulsion machine through the communication line 65L (65M, 65R).

The control device 67L (67M, 67R) provided in the propulsion machine 62L (62M, 62R) performs initialization processing in the initialization section 98 after activation. Thereafter, in the receiving section 99 of the communication line 65L (65M, 65R), the target engine rotational speed is received from the control device 66L (66M, 66R) provided in the operator seat through the communication line 65L (65M, 65R).

Thereafter, it is determined whether or not synchronization control is performed in a synchronization control section 100. At the time of starting and releasing the synchronization control, a control value is corrected such that an operation in switching a reference propulsion machine is not unstable. The processing content is equivalent to the synchronization control section 35 of FIG. 3 in Embodiment 1. Finally, in the transmitting section 101 of the communication line 65L (65M, 65R), an averaged engine rotational speed as a synchronization target calculated by the corresponding propulsion machine and fault information of the corresponding propulsion machine are transmitted to the control device 66L (66M, 66R) provided in the operator seat through the communication line 65L (65M, 65R).

Next, an example of initialization processing will be described with reference to the flowchart of the initialization section 90 of FIG. 14.

In Step h1, the initial values of the portside propulsion machine connection determination timer, the center propulsion machine connection determination timer, and the starboard propulsion machine connection determination timer which are the output of the receiving section 91 of the communication line 63 are set, and the processing progresses to Step h2.

In Step h2, the determination result initial values of portside propulsion machine connection determination, center propulsion machine connection determination, and starboard propulsion machine connection determination which are the output of the propulsion machine connection determination section 94 are set to "non-connection", and the processing progresses to Step h3.

In Step h3, a reference propulsion machine determination result initial value which is the output of the control reference propulsion machine determination section 95 is set to "another propulsion machine", and the processing progresses to Step h4.

In Step h4, the initial value of a corresponding propulsion machine connection determination timer is set, and the processing progresses to Step h5.

In Step h5, the initial value of the target engine rotational speed which is the output of the transmitting section 101 of the communication line 65L (65M, 65R) is set to an invalid value, and the processing ends.

Next, an example of reception processing of the communication line 65L (65M, 65R) in the operator seat control section 66L (66M, 66R) will be described with reference to the flowchart of the receiving section 92 of the communication line 65L (65M, 65R) of FIG. 15.

In Step i1, the corresponding propulsion machine connection determination timer is subtracted, and the processing progresses to Step i2. However, when the timer=0, subtraction for preventing underflow is not performed, and the processing progresses to Step i2.

In Step i2, it is determined whether or not the target engine rotational speed is received from the corresponding propulsion machine, that is, the control device 67L (67M, 67R). If the target engine rotational speed is received, the processing progresses to Step i3, the corresponding propulsion machine connection determination timer is reset, and the target engine rotational speed which will be transmitted through the communication line 63 is acquired. If the target engine rotational speed is not received, no operation is carried out, and the processing ends.

Next, an example of transmission processing of the transmitting section 96 of the communication line 63 will be described with reference to the flowchart of the transmitting section 96 of the communication line 63 of FIG. 16.

In Step j1, it is determined whether or not the corresponding propulsion machine connection determination timer is 0. If the corresponding propulsion machine connection determination timer is not 0, in Step j2, the target engine rotational speed of the corresponding propulsion machine is set to the target engine rotational speed received from the corresponding propulsion machine, fault information of the corresponding propulsion machine is set to fault information received from the corresponding propulsion machine, and the processing progresses to Step j4. When the corresponding propulsion machine connection determination timer is 0, it is determined that the control device 67L (67M, 67R) provided in the propulsion machine is not activated or the communication line 65L (65M, 65R) is disconnected. In Step j3, the target engine rotational speed is set to an invalid value, and the fault information of the corresponding propulsion machine is set to an invalid value. Then, the processing progresses to Step j4.

In Step j4, it is determined whether or not the reference propulsion machine determination result in the control reference propulsion machine determination section 95 is the corresponding propulsion machine. When the reference propulsion machine determination result is the corresponding propulsion machine, no operation is carried out, and the processing progresses to Step j6. When the reference propulsion machine determination result is not the corresponding propulsion machine, in Step j5, the target engine rotational speed of the corresponding propulsion machine is set to an invalid value, and the processing progresses to Step j6. In Step j6, the target engine rotational speed of the corresponding propulsion machine, the fault information of the corresponding propulsion machine, and the engine number of the corresponding propulsion machine are transmitted, and the processing ends.

Next, an example of transmission processing of the communication line 65L (65M, 65R) in the operator seat control section 66L (66M, 66R) will be described with reference to the flowchart of the transmitting section 97 of the communication line 65L (65M, 65R) of FIG. 17.

In Step k1, the reference propulsion machine determination result in the control reference propulsion machine determination section 95 is transmitted, and in Step k2, the target engine rotational speed of the portside propulsion machine, the target engine rotational speed of the center propulsion machine, and the target engine rotational speed of the starboard propulsion machine received by the receiving section 91 of the communication line 63 are transmitted.

Next, an example of initialization processing of the engine control section 72L (72M, 72R) will be described with reference to the flowchart of the initialization section 98 of FIG. 18.

In Step m1, a reference propulsion machine determination result received value (initial value) received from the control device 66L (66M, 66R) provided in the operator seat through the communication line 65L (65M, 65R) is set to "another propulsion machine", and the processing progresses to Step m2. In Step m2, the initial value of a corresponding operator seat connection determination timer which is used in the receiving section 99 of the communication line 65L (65M, 65R) described below is set, and the processing progresses to Step m3.

In Step m3, the initial values of a portside propulsion machine target engine rotational speed received value, a center propulsion machine target engine rotational speed received value, and a starboard propulsion machine target engine rotational speed received value which are used in the synchronization control section 100 described below are set to an invalid value, and the processing ends.

Next, an example of reception processing of the communication line 65L (65M, 65R) in the engine control section 67L (67M, 67R) will be described with reference to the flowchart of the receiving section 99 of the communication line 65L (65M, 65R) of FIG. 19.

In Step n1, the corresponding operator seat connection determination timer is subtracted, and the processing progresses to Step n2. However, when the timer=0, subtraction is not performed, and the processing progresses to Step n2.

In Step n2, it is determined whether or not communication data is received from the corresponding operator seat, that is, the control device 66L (66M, 66R). When communication data is received from the corresponding operator seat, in Step n3, the corresponding operator seat connection determination timer is reset, and the reference propulsion machine determination result, the portside propulsion machine target engine rotational speed, the center propulsion machine target engine rotational speed, and the starboard propulsion machine target engine rotational speed are acquired. Then, the processing progresses to Step n4. When communication data is not received from the corresponding operator seat, no operation is carried out, and the processing progresses to Step n4.

In Step n4, it is determined whether or not the corresponding operator seat connection determination timer is 0. When the corresponding operator seat connection determination timer is 0, in Step n5, the reference propulsion machine determination result (received value)="corresponding propulsion machine", the portside propulsion machine target engine rotational speed (received value)=an invalid value, the center propulsion machine target engine rotational speed (received value)=an invalid value, and the starboard propulsion machine target engine rotational speed (received value)=an invalid value are set. Then, the processing ends.

When the corresponding operator seat connection determination timer is not 0, no operation is carried out, and the processing ends.

Next, an example of transmission processing of the communication line 65L (65M, 65R) in the engine control section 67L (67M, 67R) will be described with reference to the flowchart of the transmitting section 101 of the communication line 65L (65M, 65R) of FIG. 20.

In Step p1, the target engine rotational speed of the corresponding propulsion machine, the engine number of the corresponding propulsion machine, and fault information of the corresponding propulsion machine are transmitted to the control device 66L (66M, 66R) in the corresponding operator seat through the communication line 65L (65M, 65R). Then, the processing ends.

As described above, according to Embodiment 2, in addition to the effects of Embodiment 1, for example, each of the reference propulsion machine SWs (switches) 64L, 64M, and 64R is input to the control device 66L (66M, 66R) on the operator seat side, such that it is possible to reduce the wire length of the reference propulsion machine SW (switch). The engine number is stored in the control device 66L (66M, 66R) on the operator seat side, and the control device 66L (66M, 66R) on the operator seat side and the control device 67L (67M, 67R) of the propulsion machine are connected to each other one to one, such that it is not necessary to store the engine number in the control device 67L (67M, 67R) of the propulsion machine. Therefore, when a fault occurs in a propulsion machine, or the like, and when it is necessary for the user to replace the propulsion machine with a new propulsion machine, it is effective in that the user saves time and effort to reset the engine number.

Embodiment 3

Figure 21:
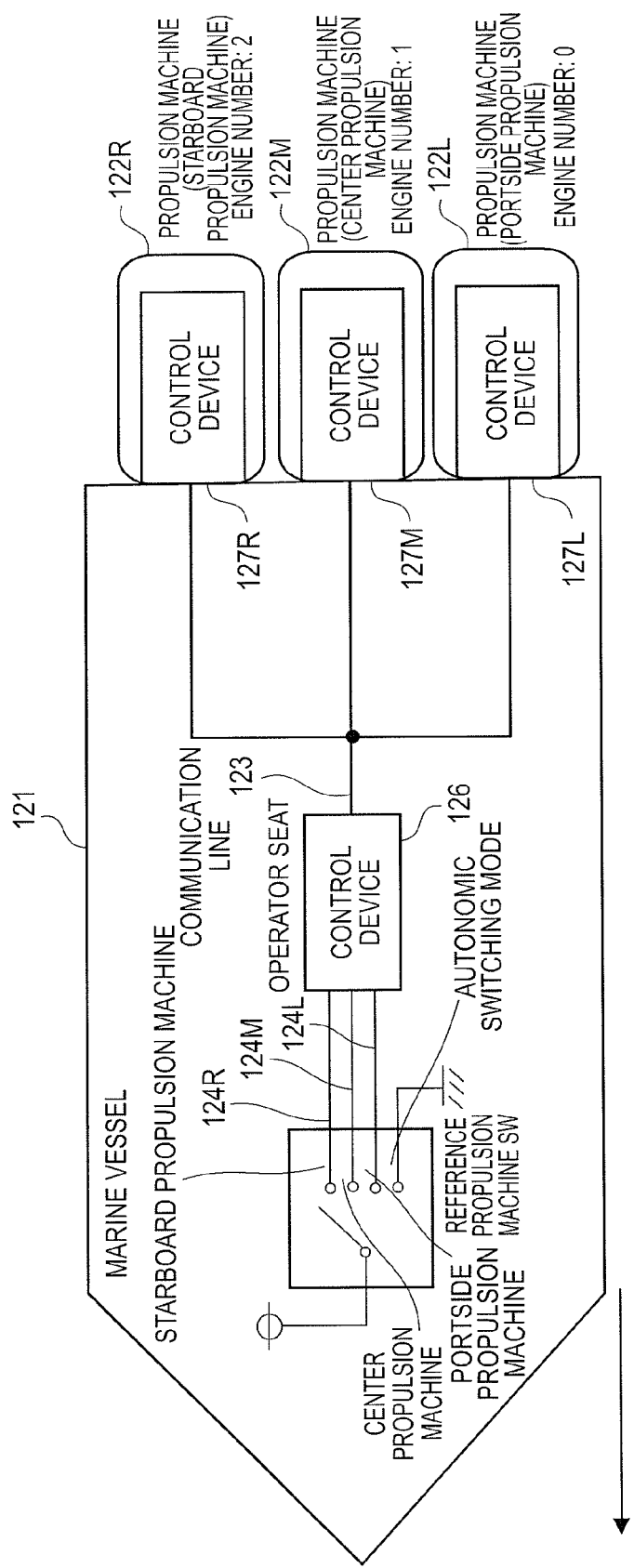
FIG. 21 is a schematic top view of a marine vessel which includes a control device for a propulsion machine according to Embodiment 3 of the invention.

FIG. 21 is a schematic top view of a marine vessel which includes a control device for a propulsion machine according to Embodiment 3 of the invention. As in Embodiment 2, FIG. 21 shows a form of DBW (Drive-By-Wire). While in Embodiment 2, the control device on the operator seat side and the control device on the propulsion machine side are connected to each other one to one, in Embodiment 3, a control device on the operator seat side and control devices for a plurality of propulsion machines are connected on the same communication network.

Although in Embodiment 3, the marine vessel has three propulsion machines mounted in a hull thereof, a plurality (for example, two or more) of propulsion machines may be mounted. Although in Embodiment 3, an outboard motor is used as a propulsion machine, a stern drive or an inboard/outboard motor may be used.

For description, a propulsion machine which is disposed on the left side with respect to a forward drive direction of a marine vessel 121 indicated by an arrow of FIG. 21 is called as a portside propulsion machine 122L, a propulsion machine which is disposed on the right side is called a starboard propulsion machine 122R, and a propulsion machine which is disposed at the center is called a center propulsion machine 122M.

In Embodiment 3, a control device 126 (described below) provided on the operator seat side carries out the reference propulsion machine switching determination in the control devices of the propulsion machines 2L, 2M, and 2R in Embodiment 1.

In FIG. 21, the control device 126 is provided on the operator seat side of the marine vessel 121, control devices 122L, 122M, and 122R are respectively provided in the propulsion machines on the hull side, and the control devices are connected to each other through a communication line 123.

Reference propulsion machine SWs (switches) 124L, 124M, and 124R which are used to detect which propulsion machine is selected as a control reference by the operator or the like are connected to the control device 126.

The reference propulsion machine SW 124L is an SW (switch) which is used to detect that the propulsion machine 122L is selected as a reference propulsion machine. The reference propulsion machine SW 124M is an SW which is used to detect that the propulsion machine 122M is selected as a reference propulsion machine. The reference propulsion machine SW 124R is an SW which is used to detect that the propulsion machine 122R is selected as a reference propulsion machine.

Although in Embodiment 3, the reference propulsion machine SWs 124L, 124M, and 124R are SWs in which a pull-up state is ON, as in Embodiment 1, SWs may be used in which a state other than the above-described state is ON.

As described above, although in Embodiment 3, an example will be described where the SWs can select all the three propulsion machines provided in the marine vessel 121 as a reference propulsion machine, as in Embodiment 1, for example, one or two of the reference propulsion machine SWs 124L, 124M, and 124R may be connected to corresponding propulsion machines. Although in Embodiment 3, as described above, the reference propulsion machine switching instruction from the operator is detected by the switch input, as in Embodiment 1, the reference propulsion machine switching instruction from the operator may be detected by a reference propulsion machine switching instruction value received from a communication device 128.

Figure 22:
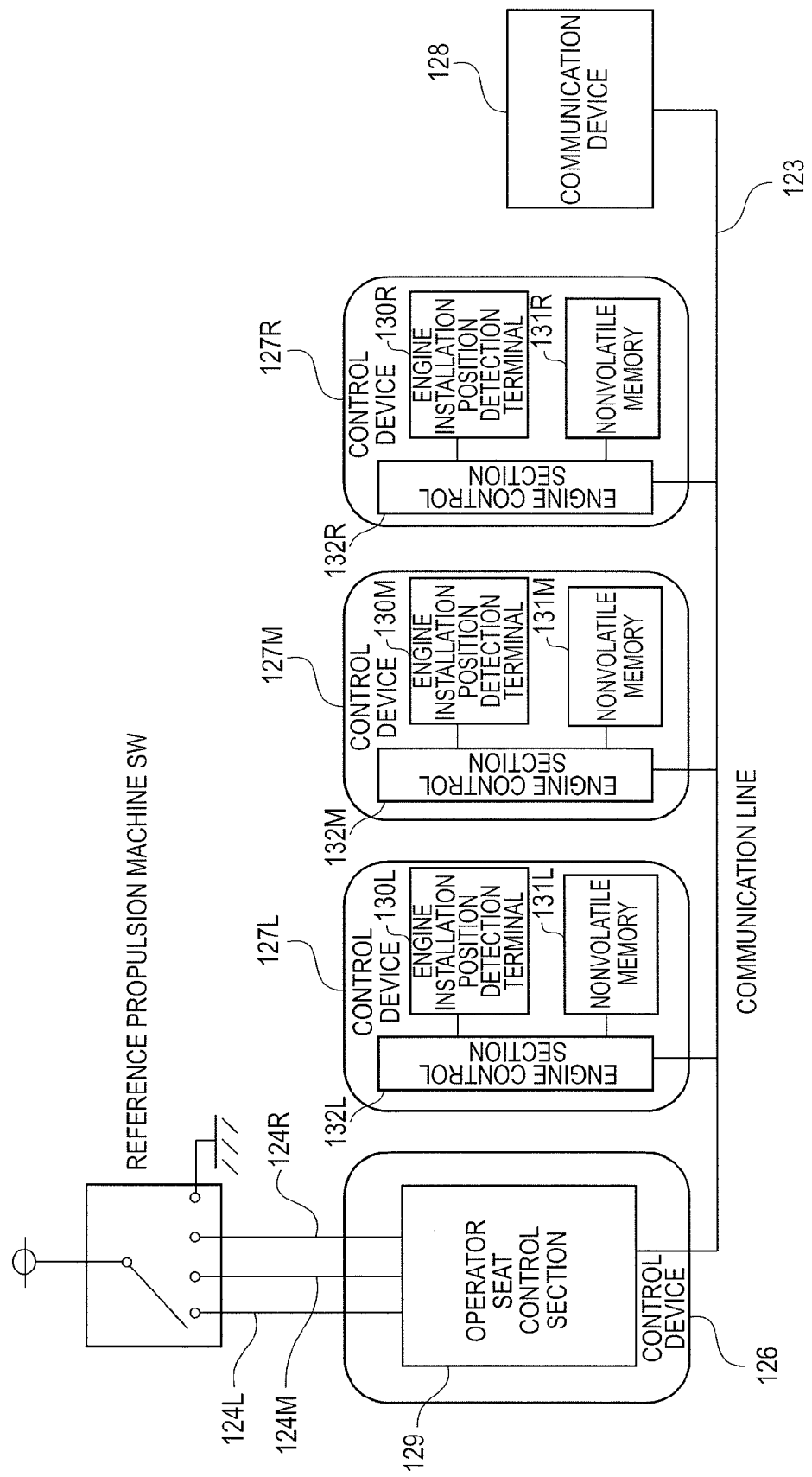
FIG. 22 is a system diagram of a control device for a propulsion machine according to Embodiment 3 of the invention.

FIG. 22 is a system diagram of a control device for a propulsion machine in FIG. 21.

An engine control section 1321, provided in the control device 127L reads an engine number from a nonvolatile memory 131L, and when the engine number read value is a value at the time of shipment of the control device, determines that the engine number is not learned. When the engine number is not learned, if a voltage value (A/D) input from an engine installation position detection terminal 130L is in a range of a portside propulsion machine determination voltage (equal to or greater than a portside propulsion machine determination lower limit value and smaller than a portside propulsion machine determination upper limit value), it is determined that the installation position of the corresponding propulsion machine is left, and the engine number corresponding to the installation position on the left side is obtained. The engine number determined by the engine installation position detection terminal 130L is stored in the nonvolatile memory 131L.

An engine control section 132R provided in the control device 127R reads an engine number from a nonvolatile memory 131R, and when the engine number read value is a value at the time of shipment of the control device, determines that the engine number is not learned. When the engine number is not learned, if a voltage value (A/D) input from the engine installation position detection terminal 130R is in a range of a starboard propulsion machine determination voltage (equal to or greater than a starboard propulsion machine determination lower limit value and smaller than a starboard propulsion machine determination upper limit value), it is determined that the installation position of the corresponding propulsion machine is right, and the engine number corresponding to the installation position on the right side is obtained. The engine number determined by the engine installation position detection terminal 130R is stored in the nonvolatile memory 131R.

An engine control section 132M provided in the control device 127M reads an engine number from a nonvolatile memory 131R, and when the engine number read value is a value at the time of shipment of the control device, determines that the engine number is not learned. When the engine number is not learned, if a voltage value (A/D) input from an engine installation position detection terminal 130M is in a range of a center propulsion machine determination voltage (equal to or greater than a center propulsion machine determination lower limit value and smaller than a center propulsion machine determination upper limit value), it is determined that the installation position of the corresponding propulsion machine is center, and the engine number corresponding to the installation position at the center is obtained. The engine number determined by the engine installation position detection terminal 130M is stored in the nonvolatile memory 131M.

In Embodiment 3, as in Embodiment 1, it is determined that a propulsion machine having the minimum engine number from the propulsion machines 122L, 122M, and 122R is a propulsion machine as a control reference. For this reason, the engine number of the portside propulsion machine is set to "0", the engine number of the center propulsion machine is set to "1", and the engine number of the starboard propulsion machine is set to "2", such that a portside propulsion machine has higher priority as a control reference. Meanwhile, the engine number of the portside propulsion machine may be set to "2", the engine number of the center propulsion machine may be set to "1", and the engine number of the starboard propulsion machine may be set to "0", such that a propulsion machine on the starboard-most side becomes a propulsion machine as a control reference. Alternatively, the engine number of the portside propulsion machine may be set to "1", the engine number of the center propulsion machine may be set to "0", and the engine number of the starboard propulsion machine may be set to "2", such that a propulsion machine on the centermost side becomes a propulsion machine as a control reference. With regard to the priority as a control reference, it may be determined that a propulsion machine having a maximum engine number or a centermost value has highest priority.

In Embodiment 3, as in Embodiment 1, the engine installation position detection terminals 130L, 130M, and 130R are respectively provided in the engine control sections 132L, 132M, and 132R of the control devices 127L, 127M, and 127R provided in the propulsion machines, and the communication device 128 is provided in the communication line 123. Thus, the engine position can be acquired by both the engine installation position detection terminals 130L, 130M, and 130R and the communication device 128. Meanwhile, either the engine installation position detection terminals 130L, 130M, and 130R or the communication device 128 may be provided.

When an engine number is received from the communication device 128, each of the engine control sections 132L, 132M, and 132R of the control devices 127L, 127M, and 127R provided in the propulsion machines determines that the engine number is the engine number of the corresponding propulsion machine and stores the engine number in each of the nonvolatile memories 131L, 131M, and 131R.

When an engine number is not received from the communication device 128, the engine number read from each of the nonvolatile memories 131L, 131M, and 131R or the engine number determined by each of the engine installation position detection terminals 130L, 130M, and 130R is set to the engine number of the corresponding propulsion machine.

When the communication device 128 is not provided, and only the engine installation position detection terminals 130L, 130M, and 130R are provided to constitute a control device, the engine number can be obtained by each of the engine installation position detection terminals 130L, 130M, and 130R. Meanwhile, when the engine installation position detection terminals 130L, 130M, and 130R are not provided, and only the communication device 128 is provided to constitute a control device, the engine number can be obtained from the communication device 128. The communication device 128 may also be used for initially setting the engine number and for relearning an arbitrary value separately customized by a user.

Hereinafter, control for switching a propulsion machine as a control reference will be described with reference to FIGS. 23 to 29.

Figure 23:
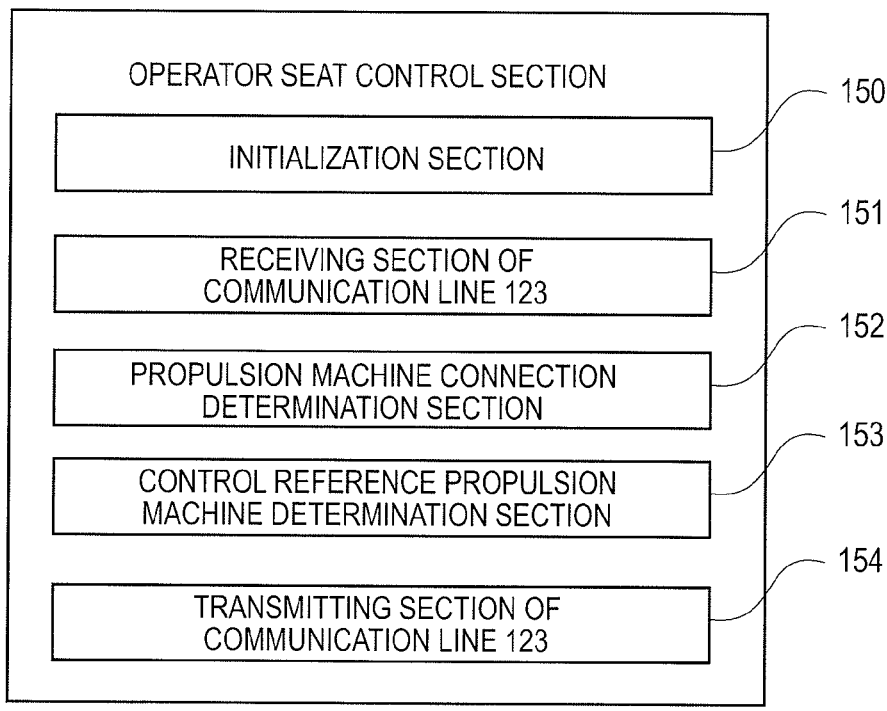
FIG. 23 is a diagram showing the configuration of an operator seat control section in an operator seat-side control device and an engine control section in a propulsion machine-side control device according to Embodiment 3 of the invention.
Figure 23:
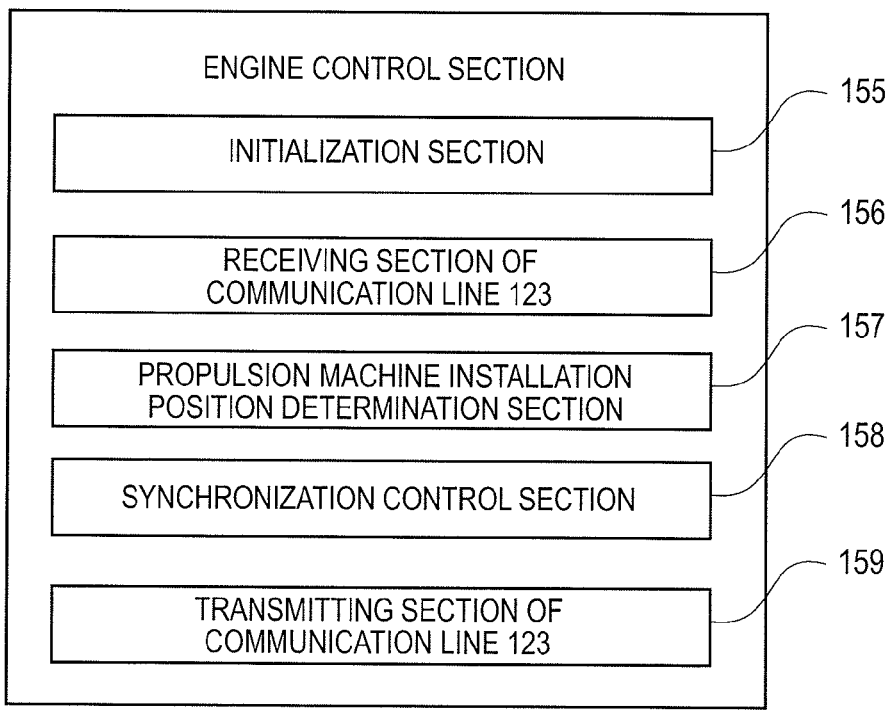
Figure 24:
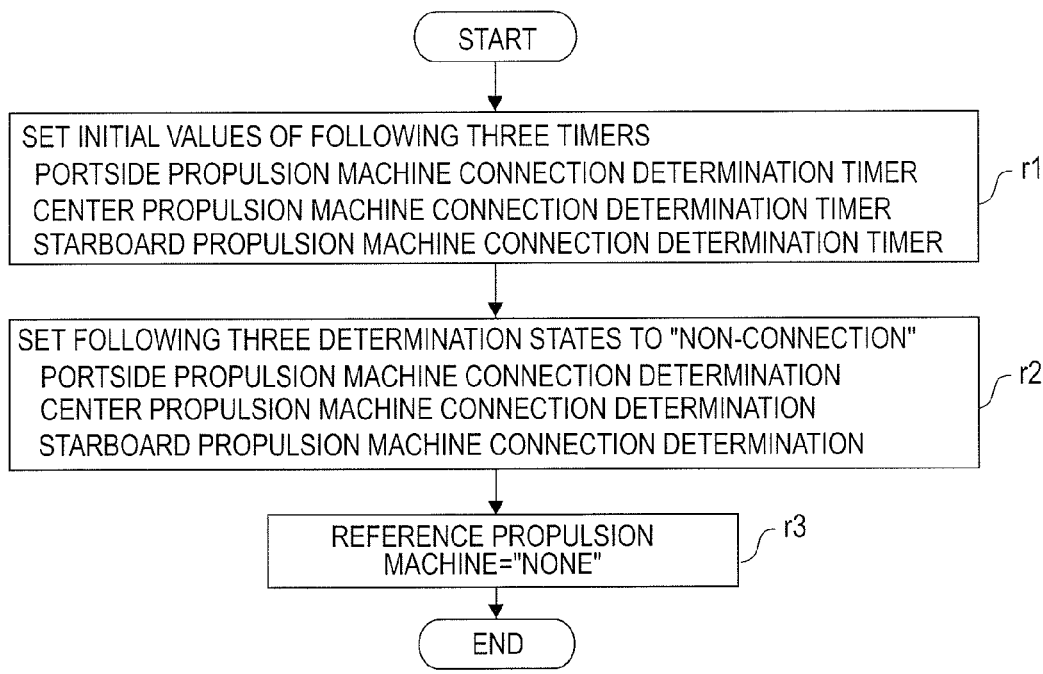
FIG. 24 is a flowchart of an initialization section in an operator seat control section according to Embodiment 3 of the invention.
Figure 25:
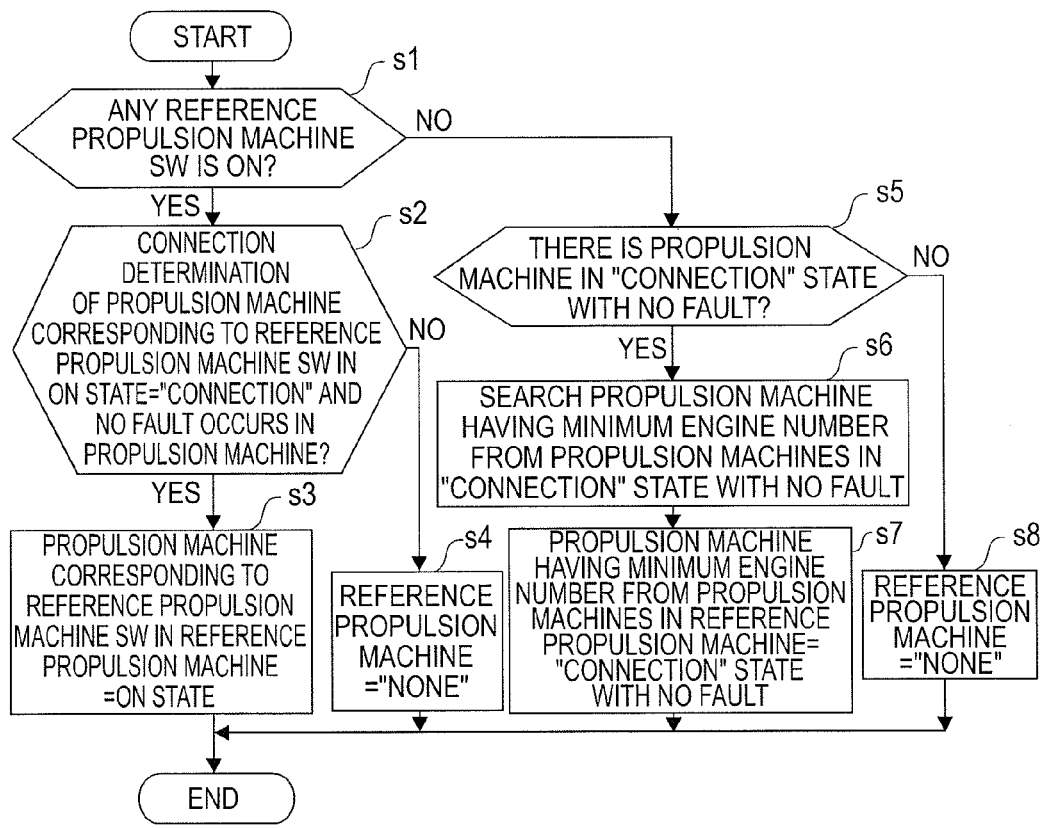
FIG. 25 is a flowchart of a control reference propulsion machine determination section in an operator seat control section according to Embodiment 3 of the invention.
Figure 26:
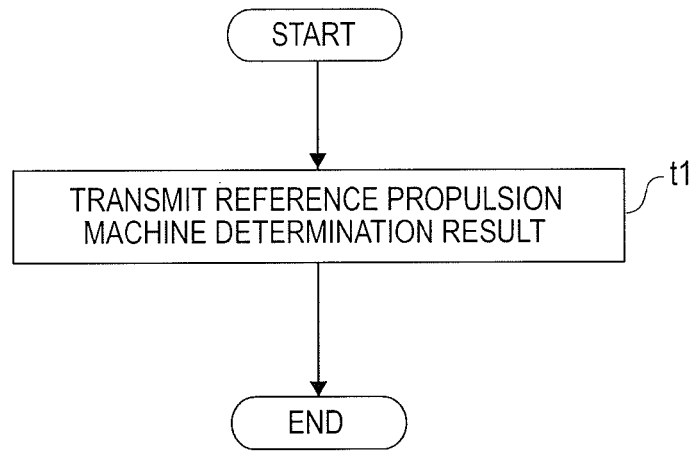
FIG. 26 is a flowchart of a communication line transmitting section in an operator seat control section according to Embodiment 3 of the invention.
Figure 27:
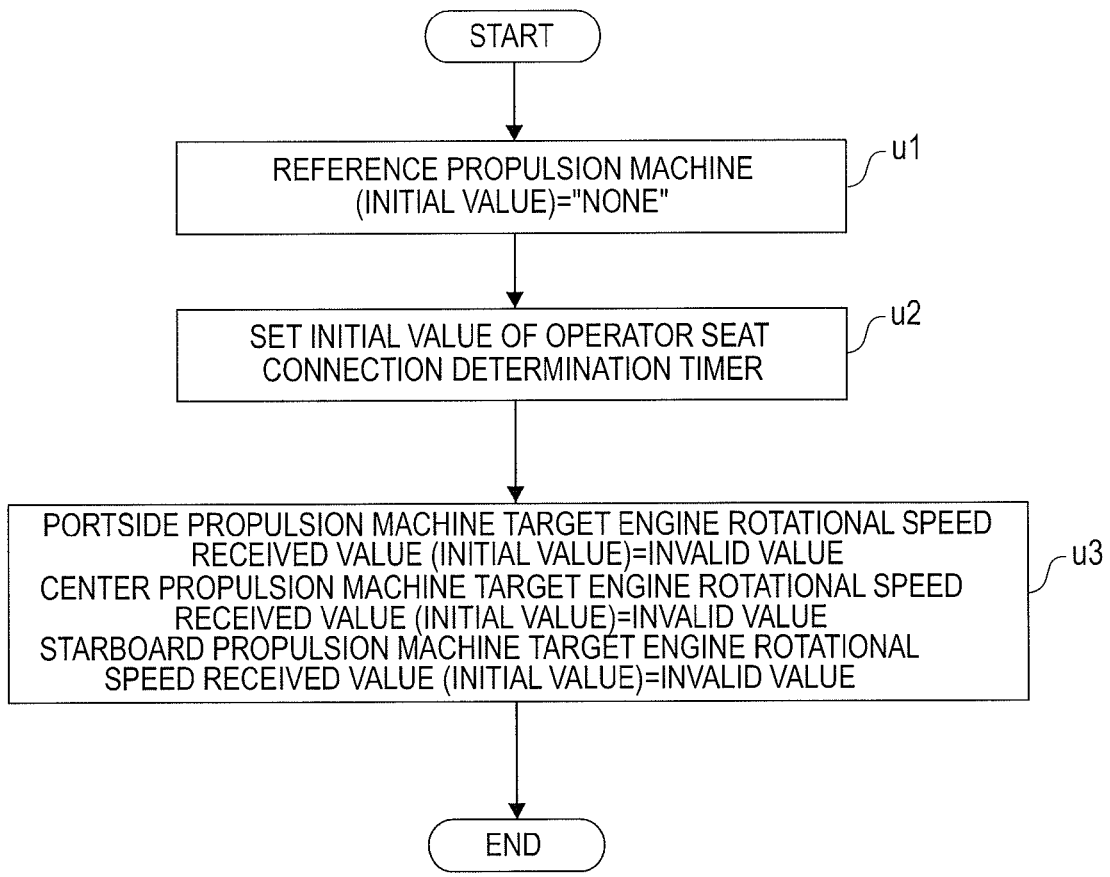
FIG. 27 is a flowchart of an initialization section in an engine control section according to Embodiment 3 of the invention.

FIG. 23 is a diagram showing the configuration of an operator seat control section in the operator seat-side control device 126 and an engine control section in the propulsion machine-side control device 127L (127M, 127R). FIG. 24 is a flowchart of an initialization section 150 in the operator seat control section 129. FIG. 25 is a flowchart of a control reference propulsion machine determination section 153 in the operator seat control section 129. FIG. 26 is a flowchart of a transmitting section 154 of the communication line 123 in the operator seat control section 129. FIG. 27 is a flowchart of an initialization section 155 in the engine control section 132L (132M, 132R). FIG. 28 is a flowchart of a receiving section 156 of the communication line 123 in the engine control section 132L (132M, 132R).

The configuration of an operator seat control section and an engine control section will be described with reference to FIG. 23.

Hereinafter, although the engine control section 132L of the portside propulsion machine 122L will be described representatively, the engine control sections 132M and 132R of the center propulsion machine 122M and the starboard propulsion machine 122R have the same configuration. In Embodiment 3, the initialization section 30 of FIG. 3 in Embodiment 1 is substituted with the initialization section 150 and the initialization section 155 described below. The control reference propulsion machine determination section 34 of FIG. 3 is substituted with the control reference propulsion machine determination section 153 of the operator seat control section 129.

The control device 126 provided in the operator seat performs initialization processing in the initialization section 150 after activation. Next, in a receiving section 151 of the communication line 123, it is determined whether or not information received through the communication line 123 is received from the control device 127L (127M, 127R), processing is performed for resetting a connection determination timer (a portside propulsion machine connection determination timer, a center propulsion machine connection determination timer, or a starboard propulsion machine connection determination timer) corresponding to the determined propulsion machine, and the target engine rotational speed, the engine number, and fault information of the determined propulsion machine are received. The processing content is equivalent to the receiving section 31 of FIG. 3 in Embodiment 1.

Thereafter, in a propulsion machine connection determination section 152, it is determined whether or not the propulsion machines 127L, 127M, and 127R are connected to the communication line 123. The processing content is equivalent to the propulsion machine connection determination section 33 of FIG. 3 in Embodiment 1. Thereafter, in the control reference propulsion machine determination section 153, a propulsion machine having the minimum engine number is searched from the propulsion machines in the "connection" state determined by the propulsion machine connection determination section 152, thereby determining a propulsion machine as a control reference.

Finally, in the transmitting section 154 of the communication line 123, the reference propulsion machine determination result by the control reference propulsion machine determination section 153 is transmitted to the control device 127L (127M, 127R) through the communication line 123.

The control device 127L (127M, 127R) provided in the propulsion machine 122L (122M, 122R) performs initialization processing in the initialization section 155 after activation. Thereafter, in the receiving section 156 of the communication line 123, the reference propulsion machine determination result and the target engine rotational speed are received from the control device 126 provided in the operator seat through the communication line 123.

Thereafter, in a propulsion machine installation position determination section 157, when information from the communication device 128 is received, an engine number is acquired by a received value from the communication device 128 and stored in the nonvolatile memory 131L (131M, 131R). When information from the communication device 128 is not received, an engine number is determined by an input voltage from the engine installation position detection terminal 130L (130M, 130R) and stored in the nonvolatile memory 131L (131M, 131R).

The processing content is equivalent to the propulsion machine installation position determination section 32 of FIG. 3 in Embodiment 1.

Thereafter, it is determined whether or not synchronization control is performed in a synchronization control section 158. At the time of starting and releasing the synchronization control, a control value is corrected such that an operation in switching a reference propulsion machine is not unstable. The processing content can be realized by substituting the determination condition in Step f2 of the synchronization control section 35 of FIG. 9 in Embodiment 1 with "whether or not reference propulsion machine=other than corresponding propulsion machine and reference propulsion machine="none"", and substituting the processing of Step f3 with "the acquisition of the target engine rotational speed of a propulsion machine corresponding to the reference propulsion machine determination result (received value).

Finally, in a transmitting section 159 of the communication line 123, an averaged engine rotational speed as a synchronization target calculated by the corresponding propulsion machine, the engine number of the corresponding propulsion machine, and fault information of the corresponding propulsion machine are transmitted to the control device 126 provided in the operator seat through the communication line 123. The processing content is equivalent to the transmitting section 101 of the communication line 65L (65M, 65R) of FIG. 20 in Embodiment 2.

Next, an example of initialization processing will be described with reference to the flowchart of the initialization section 150 of FIG. 24.

In Step r1, the initial values of the portside propulsion machine connection determination timer, the center propulsion machine connection determination timer, and the starboard propulsion machine connection determination timer which are the output of the receiving section 151 of the communication line 123 are set. Then, the processing progresses to Step r2.

In Step r2, the determination result initial values of portside propulsion machine connection determination, center propulsion machine connection determination, and starboard propulsion machine connection determination which are the output of the propulsion machine connection determination section 152 are set to "non-connection". Then, the processing progresses to Step r3.

In Step r3, the reference propulsion machine determination result initial value which is the output of the control reference propulsion machine determination section 153 is set to "none". Then, the processing ends.

Next, an example of processing for determining a propulsion machine as a control reference in the operator seat control section 129 will be described with reference to the flowchart of the control reference propulsion machine determination section 153 of FIG. 25.

In Step s1, it is determined whether or not one of the reference propulsion machine SWs 124L, 124M, and 124R is ON. When one of the reference propulsion machine SWs 124L, 124M, and 124R is ON, it is determined that there is a reference propulsion machine switching instruction from the user, and the processing progresses to Step s2.

When all the reference propulsion machine SWs 124L, 124M, and 124R is not ON, it is determined that there is no reference propulsion machine switching instruction from the user, and the processing progresses to Step s5.

In Step s2, it is determined whether or not the connection determination of a propulsion machine corresponding to the reference propulsion machine SW in the ON state="connection", and a fault occurs in the propulsion machine.

When the condition of Step s2 is established, it is determined that it is possible for the user to switch a reference propulsion machine, and the processing progresses to Step s3. When the condition of Step s2 is not established, it is determined that it is not possible for the user to switch a reference propulsion machine, and the processing progresses to Step s4. In Step s3, it is determined that the reference propulsion machine is a propulsion machine corresponding to the reference propulsion machine SW in the ON state, and the processing ends. In Step s4, the reference propulsion machine is set to "none", and the processing ends.

In Step s5, it is determined whether or not there is a propulsion machine in the "connection" state with no fault. When the condition of Step s5 is established, it is determined that there is a propulsion machine which is operable as a reference propulsion machine, and the processing progresses to Step s6. When the condition of Step s5 is not established, it is determined that there is no propulsion machine which is operable as a reference propulsion machine, and the processing progresses to Step s8.

In Step s6, a propulsion machine having the minimum engine number is searched from the propulsion machines in the "connection" state with no fault, and the processing progresses to Step s7. In Step s7, it is determined that the reference propulsion machine is a propulsion machine having the minimum engine number from the propulsion machines in the "connection" state with no fault, and the processing ends. In Step s8, the reference propulsion machine is set to "none", and the processing ends.

In Embodiment 3, as described above, the reference propulsion machine switching instruction from the operator is detected by the switch input, the reference propulsion machine switching instruction from the operator may be detected by, for example, a reference propulsion machine switching instruction value received from the communication device 128. In this case, the condition of Step s1 may be substituted with "the reference propulsion machine switching instruction value is received from the communication device 128?", and the condition of Step s2 may be substituted with "the connection determination of a propulsion machine corresponding to the reference propulsion machine switching instruction value="connection" and no fault occurs in the propulsion machine?". The processing of Step s3 may be substituted with "a reference propulsion machine=a propulsion machine corresponding to the reference propulsion machine switching instruction value received from the communication device 128".

Next, an example of transmission processing of the communication line 123 in the operator seat control section 129 will be described with reference to the flowchart of the transmitting section 154 of the communication line 123 of FIG. 26.

In Step t1, the reference propulsion machine determination result by the control reference propulsion machine determination section 153 is transmitted, and the processing ends.

Next, an example of initialization processing of the engine control section 132L (132M, 132R) will be described with reference to the flowchart of the initialization section 155 of FIG. 27.

In Step u1, the reference propulsion machine determination result (initial value) which is received from the control device 126 provided in the operator seat through the communication line 123 is set to "none", and the processing progresses to Step u2. In Step u2, the initial value of an operator seat connection determination timer which is used in the receiving section 156 of the communication line 123 described below is set, and the processing progresses to Step u3. In Step u3, the initial values of a portside propulsion machine target engine rotational speed received value, a center propulsion machine target engine rotational speed received value, and a starboard propulsion machine target engine rotational speed received value which are used in the synchronization control section 158 are set to an invalid value, and the processing ends.

Next, an example of reception processing of the communication line 123 in the engine control section 127L (127M, 127R) will be described with reference to the flowchart of the receiving section 156 of the communication line 123 of FIG. 28.

In Step v1, the operator seat connection determination timer is subtracted, and the processing progresses to Step v2. However, when the timer=0, subtraction is not performed, and the processing progresses to Step v2.

In Step v2, it is determined whether or not communication data is received from the operator seat, that is, the control device 126. When communication data is received from the operator seat, in Step v3, the operator seat connection determination timer is reset, the reference propulsion machine determination result, the portside propulsion machine target engine rotational speed, the center propulsion machine target engine rotational speed, and the starboard propulsion machine target engine rotational speed are acquired. Then, the processing progresses to Step v4.

When communication data is not received from the operator seat, no operation is carried out, and the processing progresses to Step v4.

In Step v4, it is determined whether or not the operator seat connection determination timer is 0. If the operator seat connection determination timer is 0, in Step v5, the reference propulsion machine determination result="none" is set, and the processing ends. If the operator seat connection determination timer is not 0, no operation is carried out, and the processing ends.

As described above, according to Embodiment 3, in addition to the effects of Embodiment 1, for example, as in Embodiment 2, it is possible to reduce the wire length of the reference propulsion machine SW (switch). Only the control device 126 on the operator seat side carries out reference propulsion machine switching determination, such that an integrated reference propulsion machine determination unit can be realized compared to Embodiment 1 and Embodiment 2, making it easy to control the entire system. The number of control devices on the operator seat side is small compared to Embodiment 2, making it possible to reduce system cost by that much. In future, when the reference propulsion machine determination unit of the control device 126 is updated or corrected to a newer unit, it should suffice that only the control device 126 is upgraded, thereby further reducing maintenance cost compared to Embodiment 2.

Various modifications and alterations of this invention will be apparent to those skilled in the art without departing from the scope and spirit of this invention, and it should be understood that this is not limited to the illustrative embodiments set forth herein.

What is claimed is:

1. A control device for a propulsion machine which controls the operating state of each of a plurality of propulsion machines arranged in parallel in a marine vessel, wherein the control devices of the propulsion machines are connected to each other by a communication line through which operating information of the propulsion machines is mutually transmitted and received, the control device comprising:
an installation position determination device which determines the installation position of a corresponding propulsion machine;
a connection state determination device which determines a connection state of each of the plurality of propulsion machines connected to the communication line; and
a propulsion machine determination device which determines whether a propulsion machine used as a control reference is the corresponding propulsion machine or another one of the plurality of propulsion machines,
wherein the propulsion machine determination device switches the propulsion machines used as the control reference to either the corresponding propulsion machine or another one of the plurality of propulsion machines in accordance with the operating information of the propulsion machines which is mutually transmitted and received through the communication line,
wherein when the propulsion machine used as the control reference is switched to another one of the plurality of propulsion machines, after the switch, the another one of the plurality of propulsion machines is the control reference and the another one of the plurality of propulsion machines outputs a driving signal or non-driving signal, and
wherein when no fault occurs in the propulsion machine used as the control reference, a synchronization control of the plurality of propulsion machines can be performed, but when a fault occurs in the propulsion machine used as the control reference, the synchronization control of the plurality of propulsion machines is released to the another one of the plurality of propulsion machines.

2. The control device according to claim 1,
wherein, when the fault occurs in the propulsion machine as the control reference, and when the state as a control reference cannot be maintained, the propulsion machine determination device switches the control reference to the another one of the plurality of propulsion machine.

3. The control device according to claim 1,
wherein, the propulsion machine determination device switches the control reference when an instruction to switch a propulsion machine as the control reference from a user (operator) is detected.

4. The control device according to claim 1,
wherein the propulsion machine determination device determines the priority of each propulsion machine on the basis of the engine number of each propulsion machine obtained by the installation position determination device, and switches the control reference to a propulsion machine having the highest priority.

5. The control device according to claim 1,
wherein the installation position determination device determines the installation position of the corresponding propulsion machine on the basis of an input from an installation position detection terminal provided in the control device.

6. The control device according to claim 1,
wherein the installation position determination device determines the installation position of the corresponding propulsion machine on the basis of a received value from a communication device connected to the communication line.

7. The control device according to claim 1,
wherein the engine number of each propulsion machine determined by the installation position determination device is stored in a nonvolatile memory.

8. The control device according to claim 1, wherein after the switch the another one of the plurality of propulsion machines that is the control reference receives a shift control.

9. The control device according to claim 1, wherein the installation position determination device is configured to compare a voltage value input from an engine installation position determination terminal to a range of determination voltage for each of the plurality of propulsion machines.

* * * * *